(12) United States Patent
Choi et al.

(10) Patent No.: US 8,937,924 B2
(45) Date of Patent: Jan. 20, 2015

(54) RELEASING CONNECTIONS WITH LOCAL GW WHEN UE MOVES OUT OF RESIDENTIAL/ENTERPRISE NETWORK COVERAGE

(75) Inventors: Noun Choi, Flower Mound, TX (US); Stefano Faccin, Hayward, CA (US); Chen Ho Chin, Deerlijk (BE)

(73) Assignee: Blackberry Limited, Waterloo, Ontario (CA)

(*) Notice: Subject to any disclaimer, the term of this patent is extended or adjusted under 35 U.S.C. 154(b) by 420 days.

(21) Appl. No.: 13/246,573

(22) Filed: Sep. 27, 2011

(65) Prior Publication Data

US 2012/0076121 A1 Mar. 29, 2012

Related U.S. Application Data

(60) Provisional application No. 61/387,323, filed on Sep. 28, 2010.

(51) Int. Cl.
*H04W 36/08* (2009.01)
*H04W 36/14* (2009.01)
*H04W 76/02* (2009.01)
*H04W 76/06* (2009.01)
H04W 36/24 (2009.01)
H04W 36/00 (2009.01)
H04W 84/04 (2009.01)

(52) U.S. Cl.
CPC ............ *H04W 76/064* (2013.01); *H04W 36/24* (2013.01); *H04W 36/08* (2013.01); *H04W 36/0033* (2013.01); *H04W 76/062* (2013.01); *H04W 84/045* (2013.01)
USPC ............ 370/331; 370/338; 370/252; 455/436

(58) Field of Classification Search
CPC . H04W 80/04; H04W 36/18; H04W 36/0011; H04W 36/14; H04W 36/08; H04W 36/30; H04W 36/28; H04W 84/12; H04W 88/06; H04W 88/08; H04W 84/18; H04W 80/02
USPC ......... 370/328, 329–330, 331, 332–334, 338; 455/436, 437, 438, 439, 442–444
See application file for complete search history.

(56) References Cited

U.S. PATENT DOCUMENTS

| | | | |
|---|---|---|---|
| 6,961,780 B2 | 11/2005 | Kuusinen | |
| 7,251,227 B2 * | 7/2007 | de Jong et al. | 370/331 |
| 8,369,253 B2 | 2/2013 | Faccin | |
| 8,457,635 B2 * | 6/2013 | Bachmann et al. | 455/436 |
| 8,477,724 B2 | 7/2013 | Bakker | |
| 2006/0193289 A1 | 8/2006 | Ronneke | |
| 2008/0102896 A1 | 5/2008 | Wang | |
| 2008/0305792 A1 * | 12/2008 | Khetawat et al. | 455/435.1 |
| 2009/0232022 A1 | 9/2009 | Savolainen | |
| 2009/0264126 A1 * | 10/2009 | Khetawat et al. | 455/435.1 |
| 2009/0305699 A1 * | 12/2009 | Deshpande et al. | 455/434 |
| 2010/0039993 A1 * | 2/2010 | Ramankutty et al. | 370/328 |
| 2010/0098023 A1 | 4/2010 | Aghilli | |
| 2010/0216484 A1 | 8/2010 | Zhou | |
| 2010/0224563 A1 | 9/2010 | Singh | |
| 2010/0272013 A1 * | 10/2010 | Horn et al. | 370/328 |
| 2010/0284333 A1 | 11/2010 | Shirota | |
| 2011/0002267 A1 | 1/2011 | Dwyer | |
| 2011/0045826 A1 * | 2/2011 | Kim et al. | 455/426.1 |
| 2011/0045834 A1 * | 2/2011 | Kim et al. | 455/438 |
| 2011/0075675 A1 * | 3/2011 | Koodli et al. | 370/401 |
| 2011/0116449 A1 | 5/2011 | Hu | |
| 2011/0116469 A1 * | 5/2011 | Bi et al. | 370/331 |
| 2011/0117931 A1 | 5/2011 | Hu | |
| 2011/0171953 A1 | 7/2011 | Faccin | |
| 2011/0188451 A1 * | 8/2011 | Song et al. | 370/328 |
| 2011/0310799 A1 * | 12/2011 | Horn et al. | 370/328 |
| 2011/0312321 A1 | 12/2011 | Ramachandran | |
| 2012/0028638 A1 * | 2/2012 | Mueck et al. | 455/426.1 |
| 2012/0039303 A1 | 2/2012 | Stenfelt | |
| 2012/0083273 A1 | 4/2012 | Mukherjee | |
| 2012/0120789 A1 | 5/2012 | Ramachandran | |

(Continued)

FOREIGN PATENT DOCUMENTS

| | | |
|---|---|---|
| KR | 10-2010-0119349 | 11/2010 |
| WO | WO2011142567 A2 | 11/2011 |

OTHER PUBLICATIONS

3GPP TS 23.003 V11.0.0; 3rd Generation Partnership Project; Technical Specification Group Core Network and Terminals; Numbering, Addressing and Identification; Release 11; Dec. 2011; 81 pages.
3GPP TS 23.060 V11.0.0; 3rd Generation Partnership Project; Technical Specification Group Services and System Aspects; General Packet Radio Service (GPRS); Service Description; Stage 2; Release 11; Dec. 2011; 326 pages.
3GPP TS 23.203 V11.4.0; 3rd Generation Partnership Project; Technical Specification Group Services and System Aspects; Policy and Charging Control Architecture; Release 11; Dec. 2011; 167 pages.
3GPP TS 24.301 V11.1.0; 3rd Generation Partnership Project; Technical Specification Group Core Network and Terminals; Non-Access-Stratum (NAS) Protocol for Evolved Packet System (EPS); Stage 3; Release 11; Dec. 2011; 326 pages.

(Continued)

*Primary Examiner* — Candal Elpenord
(74) *Attorney, Agent, or Firm* — Trop Pruner & Hu, P.C.

(57) ABSTRACT

A method, system and device are provided for managing LIPA and/or SIPTO connection releases when UE moves out of residential/enterprise network coverage in case service continuity is not supported for the LIPA/SIPTO PDN connection(s). To address problems caused by not providing service continuity for LIPA/SIPTO PDN connections, the PDN connection/PDP context created in the HeNB/HNB by the MME/SGSN includes context information related to the UE indicating whether such connection is a LIPA PDN connection PDN connection or not. In addition, each UE may be configured to reconnect or not reconnect to the PDN corresponding to a certain APN or service, depending on how the PDN connection was disconnected by the network.

14 Claims, 12 Drawing Sheets

(56) References Cited

U.S. PATENT DOCUMENTS

| | | | |
|---|---|---|---|
| 2012/0189016 A1 | 7/2012 | Bakker | |
| 2012/0300750 A1 | 11/2012 | Chin | |
| 2013/0143515 A1 | 6/2013 | Zhu | |
| 2013/0188604 A1 | 7/2013 | Chin | |
| 2013/0308527 A1 | 11/2013 | Chin | |

OTHER PUBLICATIONS

3GPP TS 23.401 V11.0.0; 3rd Generation Partnership Project; Technical Specification Group Services and System Aspects; General Packet Radio Service (GPRS) Enhancements for Evolved Universal Terrestrial Radio Access Network (E-UTRAN) Access; Release 11; Dec. 2011; 287 pages.
3GPP TR 23.829 V10.0.1; 3rd Generation Partnership Project; Technical Specification Group Services and System Aspects; Local IP Access and Selected IP Traffic Offload (LIPA-SIPTO); Release 10; Oct. 2011; 43 pages.
3GPP TR 23.830 V9.0.0; 3rd Generation Partnership Project; Technical Specification Group Services and System Aspects; Architecture Aspects of Home NodeB and Home eNodeB; Release 9; Sep. 2009; 55 pages.
3GPP TS 29.274 V11.1.0; 3rd Generation Partnership Project; Technical Specification Group Core Network and Terminals; 3GPP Evolved Packet System (EPS); Evolved General Packet Radio Service (GPRS); Tunnelling Protocol for Control Plane (GTPv2-C); Stage 3; Release 11; Dec. 2011; 202 pages.
3GPP TS 32.251 V11.1.0; 3rd Generation Partnership Project; Technical Specification Group Services and System Aspects; Telecommunication Management; Charging Management; Packet Switched (PS) Domain Charging; Release 11; Dec. 2011; 82 pages.
3GPP TS 36.300 V11.0.0; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2; Release 11; Dec. 2011; 194 pages.
3GPP TSG-SA WG1 Meeting #49; "SIPTO Requirements Common for Macro Network and H(e)NB Subsystems"; S1-100321; Beijing, China; Nov. 16-20, 2009; 3 pages.
3GPP TSG-SA WG1 Meeting #49; "Mobility for Local IP Access (LIPA)"; S1-100316; San Francisco, USA; Feb. 22-26, 2010; 2 pages.
3GPP TSG SA WG2 Meeting #75; "LIPA and SIPTO Node Functions"; S2-096050; Kyoto, Japan; Aug. 31-Sep. 4, 2009; 8 pages.
3GPP TSG SA WG2 Meeting #75; "Terminology Updated to Agreed Text in TR 23.8xy"; S2-096006; Kyoto, Japan; Aug. 31-Sep. 4, 2009; 5 pages.
3GPP TSG SA WG2 Meeting #75; "Architectural Requirements of Internet Offload"; S2-095900; Kyoto, Japan; Aug. 31-Sep. 4, 2009; 3 pages.
3GPP TS 36.413 V9.3.0; 3rd Generation Partnership Project; Technical Specification Group Radio Access Network; Evolved Universal Terrestrial Radio Access Network (E-UTRAN); S1 Application Protocol (S1AP); Release 9; Jun. 2010; 242 pages.
3GPP TS 23.272 V10.0.0; 3rd Generation Partnership Project; Technical Specification Group Servicse and System Aspects; Circuit Switched (CS) fallback in Evolved Packet System (EPS); Stage 2; Release 10; Jun. 2010; 74 pages.
3GPP TSG SA WG2 Meeting #80; "LIPA deactivation"; S2-104303; Brundstad, Norway; Aug. 30-Sep. 3, 2010; 16 pages.
3GPP TSG SA WG2 Meeting #80, "Addition of correlation identifier for optimised routing in LIPA"; S2-104314, Brunstad, Norway; Aug. 30-Sep. 3, 2010; 4 pages.
3GPP TSG SA WG2 Meeting #80, "The PDN disconnection during inter-RAT HO procedure"; S2-104064, Brunstad, Norway; Aug. 30-Sep. 3, 2010; 40 pages.
3GPP TSG SA WG2 Meeting #79; "Introduction of SIPTO in EPS (extended version)"; S2-102291, Kyoto, Japan; May 10-14, 2010; 14 pages.
3GPP TSG SA WG2 Meeting #76; "Discussion of LIPA_SIPTO Solution"; TD S2-096637, Cabo, Mexico; Nov. 16-20, 2009; 6 pages.
3GPP TSG SA WG2 Meeting #77; "Proposed solution of architecture variant 1"; TD S2-100007, Shenzhen, China; Jan. 18-22, 2010; 6 pages.
3GPP TSG SA WG2 Meeting #80, "LIPA deactivation"; S2-104399, Brunstad, Norway; Aug. 30-Sep. 3, 2010; 22 pages.
3GPP TSG SA WG2 Meeting #79; "Fix LIPA open issues"; TD S2-102386, Kyoto, Japan; May 10-14, 2010; 8 pages.
3GPP TSG SA WG2 Meeting #78; "Further analysis for LIPA/SIPTO solution for H(e)NB using a local PDN connection in Solution 1"; TD S2-101737, San Francisco, California, Feb. 22-26, 2010; 16 pages.
3GPP TSG SA WG2 Meeting #80; "LIPA deactivation"; S2-104400, Brunstad, Norway, Aug. 30-Sep. 3, 2010; 16 pages.
3GPP TSG SA WG2 Meeting #80; "LIPA permissions and CSG information for LIPA-able APNs in the HSS"; S2-104392, Brunstad Norway, Aug. 30-Sep. 3, 2010; 8 pages.
U.S. Appl. No. 13/576,432, Non-Final Office Action dated Feb. 24, 2014, pp. 1-10 and attachments.
U.S. Appl. No. 13/355,283, Non-Final Office Action dated Jan. 31, 2014, pp. 1-10 and attachments.
Korean Intellectual Property Office, International Search Report for PCT/US2012/022082 dated Jul. 30, 2012 (3 pages).
Korean Intellectual Property Office, Written Opinion for PCT/US2012/022082 dated Jul. 30, 2012 (4 pages).
The International Bureau of WIPO, International Preliminary Report on Patentability for PCT/US2012/022082 dated Jul. 23, 2013 (5 pages).
European Patent Office, International Search Report and Written Opinion of PCT/US2011/053505 dated Jan. 26, 2012 (16 pages).
The International Bureau of WIPO, International Preliminary Report on Patentability for PCT/US2011/053505 dated Apr. 2, 2013 (10 pages).
European Patent Office, International Search Report and Written Opinion for PCT/US2011/053512 dated Feb. 3, 2012 (20 pages).
The International Bureau of WIPO, International Preliminary Report on Patentability for PCT/US2011/053512 dated Apr. 2, 2013 (13 pages).
European Patent Office, International Search Report and Written Opinion for PCT/US2011/053525 dated Feb. 2, 2012 (33 pages).
The International Bureau of WIPO, International Preliminary Report on Patentability for PCT/US2011/053525 dated Apr. 2, 2013 (17 pages).
3GPP TS 23.401 V10.0.0; 3rd Generation Partnership Project; Technical Specification Group Services and System Aspects; General Packet Radio Service (GPRS) Enhancements for Evolved Universal Terrestrial Radio Access Network (E-UTRAN) Access; Release 10; Jun. 2010; 261 pages.
European Patent Office, International Search Report for PCT/US2011/053520 dated Dec. 20, 2011 (2 pages).
3GPP TSG SA WG2 Meeting #80, S2-103361, Change Request 23.401 CR 1647, Version 10.0.0, LIPA deactivation dated Aug. 30-Sep. 3, 2010 (10 pages).
3GPP TSG SA WG2 Meeting #80, S2-103362, Change Request 23.060 CR 1124, Version 10.0.0, LIPA deactivation dated Aug. 30-Sep. 3, 2010 (14 pages).
U.S. Appl. No. 13/355,283, Final Rejection dated May 21, 2014, pp. 1-12 and attachments.
U.S. Appl. No. 13/876,019, Non-Final Rejection dated Aug. 4, 2014, pp. 1-9 and attachments.
U.S. Appl. No. 13/576,432, Non-Final Rejection dated Aug. 11, 2014, pp. 1-12 and attachments.
U.S. Appl. No. 13/355,283, Non-Final Rejection dated Sep. 18, 2014, pp. 1-14 and attachments.
U.S. Appl. No. 13/576,432, Notice of Allowance dated Nov. 5, 2014, pp. 1-4 and attachments.

* cited by examiner

RELEASING CONNECTIONS WITH LOCAL GW WHEN UE MOVES OUT OF RESIDENTIAL/ENTERPRISE NETWORK COVERAGE

CROSS-REFERENCE TO RELATED APPLICATIONS

This application claims the benefit of U.S. patent application No. 61/387,323, filed Sep. 28, 2010.

FIELD OF THE INVENTION

The present disclosure is directed in general to communications systems and methods for operating same. In one aspect, the present disclosure relates to the methods, systems and devices for managing local IP access (LIPA) connection releases resulting from mobility of a user equipment.

DESCRIPTION OF THE RELATED ART

Within the 3rd Generation Partnership Project (3GPP), standards are being developed for the interface between the mobile core network and a femtocell which is a small cellular base station, typically designed for use in a home or small business. Home NodeB (HNB), Home eNB (HeNB) and femto cell are concepts introduced for Universal Mobile Telecommunications System (UMTS) and Long Term Evolution (LTE) evolved UMTS Terrestrial Radio Access Network (E-UTRAN) to improve indoor and micro-cell coverage as well as to leverage wireline backhaul to the "home." A femtocell is widely used outside of 3GPP to mean any cell with a very small coverage, and typically installed in a private premises (either private or corporate or residential/enterprise). The Home NodeB (HNB), Home eNB (HeNB) and femto cell can have a residential or enterprise IP network. The terms HeNB/HNB, or collectively H(e)NB, are used in 3GPP with specific meanings, i.e. that the cell is a closed subscriber group (CSG) or hybrid cell. Home Node B (HNB) refers to customer-premises equipment that connects a 3GPP UE over UTRAN wireless air interface to a mobile operator's network, e.g., using broadband IP backhaul. Home Evolved Node B (HeNB) refers to a customer-premises equipment that connects a 3GPP UE over E-UTRAN wireless air interface to a mobile operator's network, e.g., using broadband IP backhaul.

A CSG identifies subscribers of an operator who are permitted to access one or more cells of the public land mobile network (PLMN) but which have restricted access. A H(e)NB subsystem supports Local IP Access in order to provide access for IP-capable user equipment (UE) devices connected via a H(e)NB subsystem (i.e. using H(e)NB radio access) to other IP capable entities in the same residential IP network or enterprise IP network. The term macrocell, while not having significance in 3GPP specifications, is widely used to mean a cell other than a CSG cell. Examples described herein of cells that are not a CSG cell include an NodeB (NB) and an Evolved NodeB (eNB).

One aspect of HeNB/HNB functionality is the ability to restrict access to particular users. For example, access may be restricted to employees of the company on whose site the HeNB is deployed, to customers of a particular coffee shop chain, or (in the case of HeNBs deployed in private homes) to individuals. To achieve this functionality, 3GPP has defined the concept of the Closed Subscriber Group (CSG). The CSG cell is one which indicates that it is a CSG cell (by means of 1 bit broadcast in the system information) and broadcasts a CSG ID (also in system information). A cell can only indicate one (or none) CSG IDs, however multiple cells may share a CSG ID. A UE device may be subscribed to multiple CSGs. The UE may for example may be a mobile terminal such as, but not limited to a cellular telephone, a personal data assistant (PDA), or a wirelessly enabled computer. A subscription may be temporary in nature (e.g., a coffee shop allows a customer one hour's access to its CSG).

3GPP standards are also being developed for the concept of selected IP traffic offloading (SIPTO) which allows internet traffic to flow from the femtocell directly to the internet, bypassing the operator's core network. SIPTO is used to offload selected types of IP traffic (e.g. internet traffic) towards a defined IP network close to the UE's point of attachment to the access network. SIPTO is applicable to traffic offload for the macro-cellular access network and for the femto cell subsystem. SIPTO PDN Connectivity indicates a PDP Context or PDN Connection that allows offload of selected types of IP traffic (e.g. internet traffic) towards a defined IP network close to the UE's point of attachment to the access network. SIPTO is applicable to traffic offload for the macro-cellular access network and for the femto cell subsystem.

In addition, standards are being developed for local IP Access (LIPA) which allows an IP-capable UE connected via a femto cell direct access to other IP-capable devices in the local residential/corporate IP network. LIPA PDN Connectivity indicates a PDP Context (in the case of a GERAN or UTRAN femto cell connected to a GPRS core network) or a PDN Connection (in the case of an E-UTRAN femto cell connected to a GPRS core network) that gives access to services located in the local residential/corporate IP network of the femto cell subsystem.

Local IP Access (LIPA) provides access for IP-capable UEs connected via a H(e)NB (i.e. using H(e)NB radio access) to other IP capable entities in the same residential/enterprise IP network. Traffic for Local IP Access is expected to not traverse the mobile operator's network except H(e)NB. A LIPA PDN Connection/PDP Context is a PDN Connection or PDP Context that gives access to the UE to services located in the local residential/corporate IP network. The PDN GW/GGSN (or Local GW) is selected in such a way to provide this type of connectivity. Alternatively, a LIPA PDN Connection/PDP context is defined as a PDN Connection/PDP context that provides access for IP capable UEs connected via a H(e)NB (i.e. using H(e)NB radio access) to other IP capable entities in the same residential/enterprise IP network. Alternatively, a LIPA PDN connection or LIPA PDP context is a PDN Connection that the MME authorizes for connectivity to a PDN GW for a UE connected to a HeNB based on a request from the UE for LIPA connectivity and based on the CSG ID of the HeNB. Alternatively, a LIPA PDN connection or LIPA PDP context is a PDN Connection which was activated by the UE requesting LIPA connectivity type "LIPA" and the MME informing the UE of the connectivity type provided.

LIPA PDN Continuity refers to the UE having a LIPA PDN Connection/PDP Context while camping or connected in a H(e)NB that maintains the connection when moving to another H(e)NB or to a macro cell.

An evolved packet core (EPC) functionality (e.g., SGSN, MME, S-GW, PDN GW, GGSN, etc.) is LIPA-aware and/or SIPTO-aware and/or SIPTO-local-aware if the functionality determines that a given PDN connection or PDP context is a LIPA/SIPTO/SIPTO-local PDN connection or PDP context. Alternatively, the functionality is LIPA-aware and/or SIPTO-aware and/or SIPTO-local-aware if it is configured to manage network contexts (e.g. PDN connection/PDP context descriptors and related signaling) for LIPA/SIPTO/SIPTO-local connections.

A H(e)NB Gateway is a mobile network operator's equipment (usually physically located on mobile operator premises) through which the H(e)NB gets access to mobile operator's core network. For HeNBs, the HeNB Gateway is optional.

The network architecture model for the support of CSG Cells is described in 3GPP TR 23.830 (Architecture aspects of Home NodeB and Home eNodeB) and depicted with reference to FIG. 1 which shows an architecture model for a Home NodeB access network 100. As depicted, the network 100 includes one or more CSG-capable UEs 170 in communication with a HNB 110 over reference point Uu 175. The UEs 170 may, for example, be a mobile terminal such as, but not limited to, a cellular telephone, a personal data assistant (PDA), or a wirelessly enabled computer. The HNB 110 is in communication with a HNB gateway (HNB GW) 120 over reference point Iuh 115. The HNB GW 120 is in communication with mobile switching center/visitor location center (MSC/VLR) 130 over reference point Iu-CS 124. The HNB GW 120 is also in communication with serving GPRS Support Node (SGSN) 140 over reference point Iu-PS 126. A CSG List Server (CSG List Srv) 150 and home location register/home subscriber server (HLR/HSS) 160 are part of a home public land mobile network (HPLMN) 190. Networks that are not the HPLMN 190 on which the UE may operate are a visited public land mobile network (VPLMN) 180. The MSC/VLR 130 and the SGSN 140 are each in communication with the HLR/HSS 160 over reference points D 135 and GRs6d 145, respectively. One of the CSG enabled UEs 170 is in communication with the CSG List Srv 150 over reference point C1 185. A more detailed description of the elements and communication reference points of FIG. 1 are provided hereinbelow.

HNB 110: The HNB 110 provides the RAN connectivity using the Iuh 115 interface, supports the NodeB and most of the radio network controller (RNC) functions and also HNB authentication, HNB-GW discovery, HNB registration and UE registration over Iuh 115. The HNB 110 secures the communication to/from the SeGW.

HNB GW 120: The HNB GW 120 serves the purpose of a RNC presenting itself to the core network (CN) as a concentrator of HNB connections, i.e. the HNB GW 120 provides concentration function for the control plane and provides concentration function for the user plane. The HNB GW 120 supports Non Access Stratum (NAS) Node Selection Function (NNSF).

Uu 175: Standard Uu interface between the UE 170 and the HNB 110.

Iuh 115: Interface between the HNB 110 and HNB GW 120. For the control plane, Iuh 115 uses HNBAP protocol to support HNB registration, UE registration and error handling functions. For the user plane, Iuh support user plane transport bearer handling.

Iu-CS 124: Standard Iu-CS interface between the HNB GW 120 and the circuit switched (CS) core network.

Iu-PS 126: Standard Iu-PS interface between the HNB GW 120 and the packet switched (PS) core network.

D 135: Standard D interface between mobile switching center/visitor location center (MSC/VLR) 130 and home location register/home subscriber server (HLR/HSS) 160.

Gr/S6d 145: Standard Gr interface between serving GPRS Support Node (SGSN) 140 and HLR/HSS 160.

C1 185: Optional interface between the CSG List Server (CSG List Srv) 150 and CSG-capable UEs 170. Over-the-air (OTA) signaling is used to update the allowed CSG list on a UE 170 with a Release 8 (Rel-8) Universal Subscriber Identity Module (USIM). In some embodiments, Open Mobile Alliance (OMA) Device Management (DM) is used to update the Allowed CSG list on the UE 170 with a pre-Rel-8 USIM.

UEs that are capable of supporting Rel-8 functionality of the 3GPP standard may support CSG functionality and maintain a list of allowed CSG identities. This list can be empty in case the UE does not belong to any CSG.

Each cell of a HeNB may belong to, at maximum, one CSG. It is possible for cells of a HeNB to belong to different CSGs and hence have different CSG IDs.

The Allowed CSG List is provided as part of the CSG subscriber's subscription data to the MME.

The Allowed CSG List can be updated in the UE according to the result of the attach procedure, the Tracking Area Update (TAU) procedure, service request and detach procedures or by application level mechanisms such as OMA DM procedures.

The MME performs access control for the UEs accessing through CSG cells during attach, combined attach, detach, service request and TAU procedures.

The UE is notified of the cause of rejection by the network if the UE is not allowed to access a CSG cell.

When a CSG ID which is not included in the UE's Allowed CSG List is manually selected by the user, a TAU procedure via the selected CSG cell may be triggered immediately by the UE to allow MME to perform CSG access control.

There is no restriction on Tracking Area Identity (TAI) assignment for E-UTRAN CSG cells. As a result, it is possible that a normal cell (non-CSG cell) and a CSG cell can share the same TAI or have different TAIs. In addition, it is possible that CSG cells with different CSG ID can share the same TAI or have different TAIs. It is also possible that CSG cells with the same CSG ID can share the same TAI or have different TAIs.

The concept of TAI list applies also for CSG cells. The TAI list may include TAIs related to CSG cells and TAIs related to non-CSG cells. The UE does not differentiate these TAIs in the TAI list.

For the case of HeNB GW deployment, TAIs supported in the HeNB GW are the aggregation of TAIs supported by the CSG cells under this HeNB GW.

Several architectures for HeNB CSG Cells will now be described with reference to FIGS. 2-4. Starting with FIG. 2, there is depicted an architecture model for a HeNB access network 200 which includes a dedicated HeNB GW. In the depicted network 200, a single UE 270 is in communication with a HeNB 210 over reference point LTE-Uu 275. The HeNB 210 is also in communication with a HeNB gateway (HeNB GW) 220 over reference point 51 215. The HeNB GW 220 is in communication with mobility management entity (MME) 230 over reference point S1-MME 224, and is also in communication with serving gateway (S-GW) 240 over reference point S1-U 226. A CSG List Server (CSG List Srv) 250 and home subscriber server (HSS) 260 are part of a home public land mobile network (HPLMN) 290. Networks that are not the HPLMN 290 on which the UE may operate are a visited public land mobile network (VPLMN) 280. The MME 230 is in communication with the HSS 260 over reference point S6a 235. The S-GW 240 is in communication with the MME 230 over reference point S11 245. The UE 270 is in communication with the CSG List Srv 250 over reference point C1 285. A more detailed description of the elements and communication reference points of FIG. 2 are provided below.

HeNB 210: The functions supported by the HeNB 210 may be the same as those supported by an eNB (with the possible exception of Non Access stratum (NAS) node selection function (NNSF)) and the procedures run between a HeNB and the evolved packet core (EPC) may be the same as those between an eNB and the EPC. The HeNB 210 secures the communication to/from the SeGW 240.

HeNB GW 220: HeNB GW 220 serves as a concentrator for the control plane (C-Plane), specifically the S1-MME interface 224. The HeNB GW may optionally terminate the user plane towards the HeNB 210 and towards the S-GW 240, and provide a relay function for relaying User Plane data between the HeNB 210 and the S-GW 240. In some embodiments, the HeNB GW 220 supports NNSF.

S-GW 240: The Security Gateway 240 is a logical function that may be implemented either as a separate physical entity or co-located with an existing entity. The S-GW 240 secures the communication from/to the HeNB 210.

LTE-Uu 275: Standard LTE-Uu interface between the UE 270 and the HeNB 210.

S1-MME 224: The S1-MME 224 interface is defined between HeNB 210 and MME 230 if no HeNB GW 220 is used. If HeNB GW 220 is present, as in FIG. 2, the HeNB GW 220 may use an S1-MME interface towards both HeNB (S1 215) and MME (S1-MME 224).

S1-U 226: The S1-U data plane is defined between the HeNB 210, HeNB GW 220 and the Serving Gateway (S-GW) 240, depending upon the arrangement of network elements. The S1-U 226 interface from the HeNB 210 may be terminated at the HeNB GW 220, or a direct logical U-Plane connection between HeNB and S-GW may be used.

S11 245: Standard interface between MME 230 and S-GW 240.

S6a 235: Standard interface between MME 230 and HSS 260.

C1 285: Optional interface between the CSG List Srv 250 and CSG-capable UEs 270. OTA is used to update the allowed CSG list on a UE 270 with a Rel-8 USIM. OMA DM is used to update the Allowed CSG list on a UE with a pre-Rel-8 USIM.

With reference to FIG. 3, there is depicted an architecture model for a HeNB access network 300 which does not include a dedicated HeNB GW. In the depicted network 300, a single UE 370 is in communication with a HeNB 310 over reference point LTE-Uu 375. The HeNB 310 is in communication with a S-GW 340 over reference point S1-U 326, and is also in communication with MME 330 over reference point S1-MME 324. A CSG List Srv 350 and HSS 360 are part of a HPLMN 390. Networks that are not the HPLMN 390 on which the UE may operate are a VPLMN 380. The MME 330 is in communication with the HSS 360 over reference point S6a 335. The S-GW 340 is in communication with the MME 330 over reference point S11 345. The UE 370 is in communication with the CSG List Srv 350 over reference point C1 385.

With reference to FIG. 4, there is depicted an architecture model for a HeNB access network 400 which includes a HeNB GW for the C-Plane. In the depicted network 400, a single UE 470 is in communication with a HeNB 410 over reference point LTE-Uu 475. The HeNB 410 is in communication with a S-GW 440 over reference point S1-U 426, and is also in communication with a HeNB-GW 420 over reference point S1-MME 422. The HeNB-GW 420 is in communication with MME 430 over reference point S1-MME 424. A CSG List Srv 450 and HSS 460 are part of a HPLMN 490. Networks that are not the HPLMN 490 on which the UE may operate are a VPLMN 480. The MME 430 is in communication with the HSS 460 over reference point S6a 435. The S-GW 440 is in communication with the MME 430 over reference point S11 445. The UE 470 is in communication with the CSG List Srv 450 over reference point C1 485.

Traditionally, the UE connects to services through a remote connection using a PDP Context towards a GGSN in the core network in the case of 2G/3G, and a PDN Connection to a PGW in the Evolved packet system (EPS). As will be appreciated, PDN connection procedures are described in 3GPP TS 23.401 ("General Packet Radio Service (GPRS) enhancements for Evolved Universal Terrestrial Radio Access Network (E-UTRAN) access") and 3GPP TS 24.301 ("Non-Access-Stratum (NAS) protocol for Evolved Packet System (EPS)"). Additional signal flow information relating to PDN connectivity setup and handover procedures is described in U.S. patent application Ser. No. 12/685,651 (filed Jan. 11, 2010), and U.S. patent application Ser. No. 12/685,662 (filed Jan. 11, 2010), now U.S. Pat. No. 8,477,724, which are each incorporated herein by reference as is fully set forth herein.

As explained above, 3GPP is introducing the concepts of local IP access (LIPA) and selective IP traffic offloading (SIPTO) to supplement the traditional way for connecting a UE to services through a remote connection (PDP Context towards a GGSN in the core network in the case of 2G/3G, and a PDN Connection to a PGW in the Evolved packet system (EPS). With LIPA and SIPTO connections, the UE is connected to a HNB/HeNB located in a home or corporate environment to obtain local connectivity, i.e. connectivity through the IP network local to the HNB (i.e. the (residential or enterprise) IP network in the HNB "home" premises). An example of this scenario is when a given application in the UE needs to print on a local printer, or an application needs to download an updated music playlist from a local media server. Several architectures for providing LIPA and SIPTO connections over HNB/HeNB cells will now be described with reference to FIGS. 5 and 6, where the difference between LIPA connectivity and normal connectivity is also highlighted.

With reference to FIG. 5, there is illustrated a schematic diagram of an example logical architecture network 1000 for use in a HNB cell illustrating Local IP connectivity. The depicted network 1000 is substantially the same as FIG. 1 with the addition of a Gateway GPRS Support Node (GGSN) 196 connected to the SGSN 140, a PDN 198 connected to the GGSN 196, and a home network 104 that has an illustrated coverage area defined by the circle shape. LIPA PDN connectivity is illustrated from the UE 170 through the HNB 110 to the local service 106 via dotted line 108. Normal PDN connectivity via the core network (HNB GW 120, SGSN 140 and GGSN 196) is illustrated from the UE 170 to the PDN 198 via dashed line 105.

In the HNB scenarios, a UE 170 determines whether it has access to a given HNB 110 thanks to the UE 170 having knowledge of its belonging to a specific Closed Subscriber Group (CSG). The operator/owner of an HNB 110 creates list of CSGs and provisions the UEs 170, 172 with CSG lists so that the UE 170, 172 determines which HNBs it can connect to. Therefore, a UE 170, 172 that is moving in macro-coverage (i.e. in cellular cells not belonging to a CSG/HNB) may come across a CSG/HNB cell 104. The UE 170, 172 would use the CSG information to decide whether to attempt connection to such HNB 110 or not. CSG information is typically configured in the UE 170, 172 by the operator and can dynamically be modified, e.g. using OMA-DM (Device Management). USIM information to support LIPA is also foreseen. Some of this information may be managed by the H(e)NB hosting party too.

With reference to FIG. 6, there is illustrated a schematic diagram of the example logical architecture network 1100 for use in a HeNB cell illustrating Local IP connectivity. The depicted network 1100 is substantially the same as FIG. 2 with the addition of a PGW 296 connected to the S-GW 240, a PDN 298 connected to the PGW 296, and a home network 204 that has an illustrated coverage area defined by a circle shape. LIPA PDN connectivity is illustrated from the UE 270 through the HeNB 210 to the local service 206 via dotted line 208. Normal PDN connectivity via the core network (HeBN 210, HeNB GW 220, S-GW 240 and PGW 296) is illustrated from the UE 270 to the PDN 298 via dashed line 205. In the HeNB scenarios, a UE 270 also determines its access rights to the HeNB network 204 using the CSG list provided by the HeNB 210.

As will be appreciated, the relevant 3GPP specifications in this area include 3GPP TR 23.829 entitled "Local IP Access & Selected IP Traffic Offload" (which describes the mechanisms for IP traffic offloading) and 3GPP S2-096006 entitled "Terminology update to agreed text in TR 23.8xy" (which introduced LIPA and SIPTO functionalities and architectural aspects). In addition, 3GPP S2-096050 entitled "LIPA and SIPTO node functions" and 3GPP S2-096013 entitled "Internet offload for macro network" set forth the architectural principles for selected embodiments of the disclosure relating to Local IP Access and Selected IP Traffic Offload based on traffic breakout performed within H(e)NB using a local PDN connection, as well as Local IP Access and Selected IP Traffic Offload at H(e)NB by NAT. 3GPP S2-095900 entitled "Architectural Requirements of Internet Offload" introduced the architectural requirement that traffic offload can be performed without user interaction, and that the impact on the existing network entities and procedures by introducing traffic offload be minimized.

In addition to the foregoing, 3GPP S2-096013 entitled "Internet offload for macro network" introduced an additional SIPTO solution which supports SIPTO for UMTS macros and for HNB subsystems. The additional SIPTO solution is depicted in the schematic diagram of FIG. 7 which shows an example logical architecture showing a Traffic Offload Function (TOF) 1208 deployed at Iu-P S. In the depicted architecture, the TOF 1208 is located at Iu-PS and provides standard Iu-PS interface to the RNC 1206 and the SGSN 1210. Selected IP Traffic Offload is enabled by NAT and SPI/DPI based on operator policies at different levels (e.g. per user, per APN, per service type, per IP address, etc). The policies may be configured via e.g. OAM. One PDN connection or PDP context for both offload traffic and non-offload traffic is supported, while also allowing use of different PDN connections or PDP contexts for offload traffic and non-offload traffic (e.g. by selecting the traffic based on APN). The TOF 1208 includes a number of functions. First, the TOF 1208 inspects both NAS and RANAP messages to get subscriber information and establish local UE context. The TOF 1208 also decides the offload policy to be applied based on above information (e.g., during attach and PDP context activation procedures). In addition, TOF 1208 drags the uplink traffic out from the GTP-U tunnel and performs NAT to offload the traffic if offload policy is matched. TOF 1208 may also perform reverse NAT to the received downlink offload traffic and inserts it back to the right GTP-U tunnel A local gateway-based architecture solution is also introduced at 3GPP 52-096015 entitled "Local GW Based Architecture" which supports Local IP Access for H(e)NB subsystem, Selected IP Traffic Offload for H(e)NB subsystem, and Selected IP Traffic Offload for macro network. The solution applies to both types of approaches: with separate APNs for SIPTO and non-SIPTO traffic, and also with common APN(s) for SIPTO and non-SIPTO traffic. The local gateway solution is depicted in the schematic diagram of FIG. 8 which shows an example logical architecture for a proposed extension of non-roaming architecture for 3GPP accesses for SIPTO and LIPA. In the depicted architecture, a Local Gateway (L-GW) 1306 is co-located with the (H)eNB 1304. Between L-GW 1306 and PDN GW 1310, a Local-GW Extension Tunnel 1326 is configured. The L-GW 1306 performs gateway and routing to/from external PDN (e.g. internet, enterprise or home NW) that is equivalent to SGi. In addition, the L-GW 1306 performs tunneling of IP packets through the extension tunnel 1326 to/from PDN GW 1310 (e.g., based on GTP, PMIP, IP in IP or other). The L-GW 1306 also performs IP address handling (either IP address allocation and conveyance to PDN GW, or alternatively reception of IP address from PDN GW and NATing), as well as coordination with the (H)eNB 1304 on usage of local breakout (trigger eNB for local traffic handling). The L-GW 1306 also implements a decision function on the usage of local breakout for uplink traffic (optionally it can be part of the eNB). As will be appreciated, the L-GW 1306 is not a PDN GW shifted to eNB/E-UTRAN, but encompasses only minimal functionality.

With the L-GW 1306, the functionality of the PDN GW 1310 is enhanced by establishing the extension tunnel 1326 upon PDN connection establishment for APNs matching the criteria for local traffic. In addition, the PDN GW 1310 forwards traffic through extension tunnel 1326 and to/from S5/S8 tunnel, and performs IP address handling (either obtain IP address from L-GW, or alternatively conveyance to L-GW).

At the (H)eNB 1304, there is provided UE access state information for the cell(s) served by the (H)eNB 1304 to the L-GW 1306. In addition, the (H)eNB 1304 implements a decision function on usage of local breakout for uplink traffic (based on APN). With the enhanced architecture shown in FIG. 8, mobility between 3GPP and non-3GPP accesses can be managed since the PDN GW 1310 is always in the path when the UE 1302 leaves the (H)eNB 1304, meaning that the mobility support function of handover towards non-3GPP accesses can be handled by the PDN GW 1310 as usual. As a result, such functionality does not need to be provided as part of the L-GW 1305 or within the (H)eNB 1304. In addition, it is possible to achieve dynamic control for LIPA/SIPTO handling in the PDN-GW 1310 which is switched on only after the extension tunnel 1326 is set up.

Accordingly, a need exists for improved method, system and device for managing LIPA connection releases to overcome the problems in the art, such as outlined above. Further limitations and disadvantages of conventional processes and technologies will become apparent to one of skill in the art after reviewing the remainder of the present application with reference to the drawings and detailed description which follow.

BRIEF DESCRIPTION OF THE DRAWINGS

The present disclosure may be understood, and its numerous objects, features and advantages obtained, when the following detailed description is considered in conjunction with the following drawings, in which.

DETAILED DESCRIPTION

Figure 1:
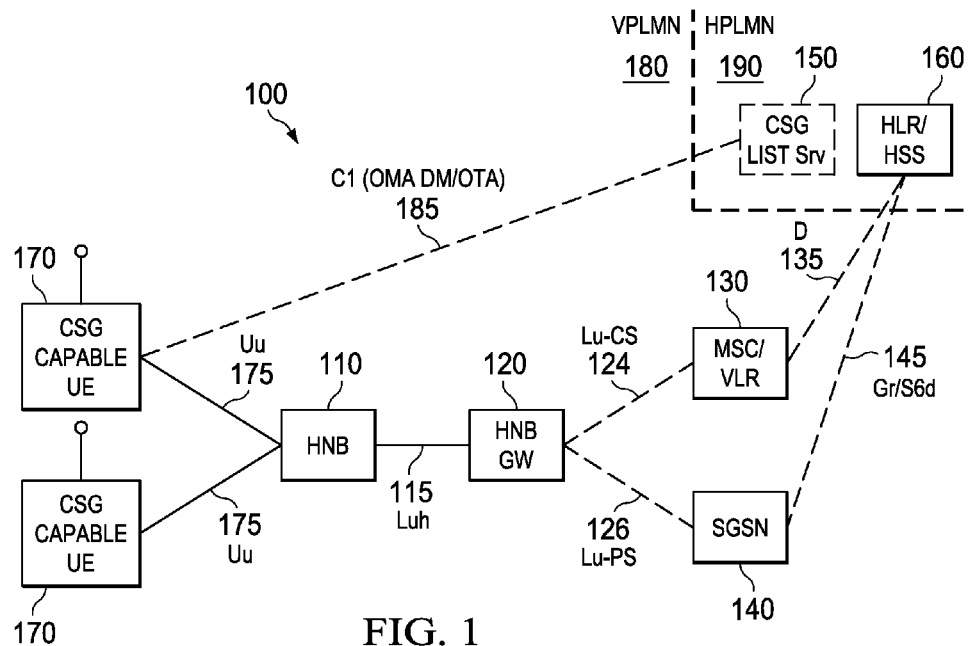
FIG. 1 is a schematic diagram of an example logical architecture for use in a HNB cell.
Figure 2:
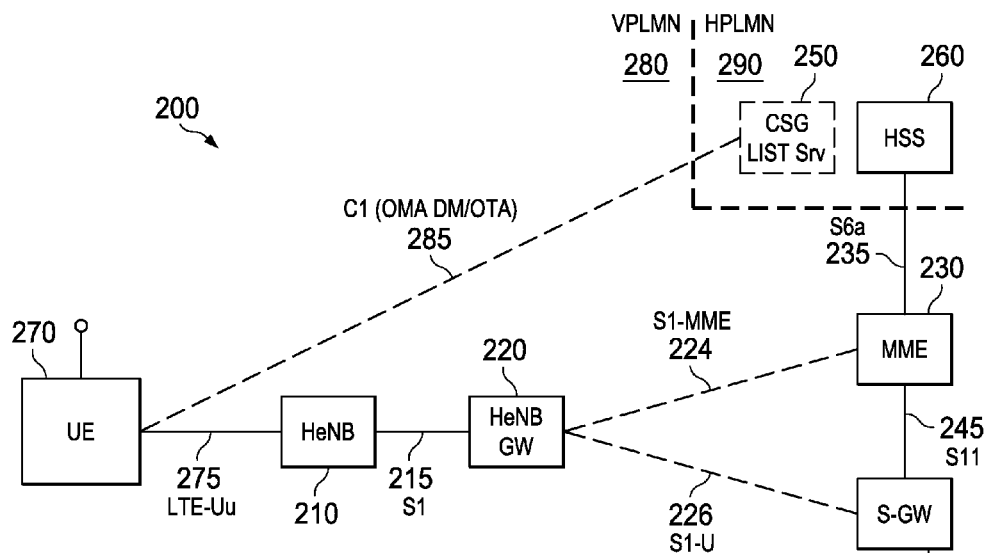
FIG. 2 is a schematic diagram of an example logical architecture for use in a HeNB cell in which the network includes a dedicated HeNB GW.
Figure 3:
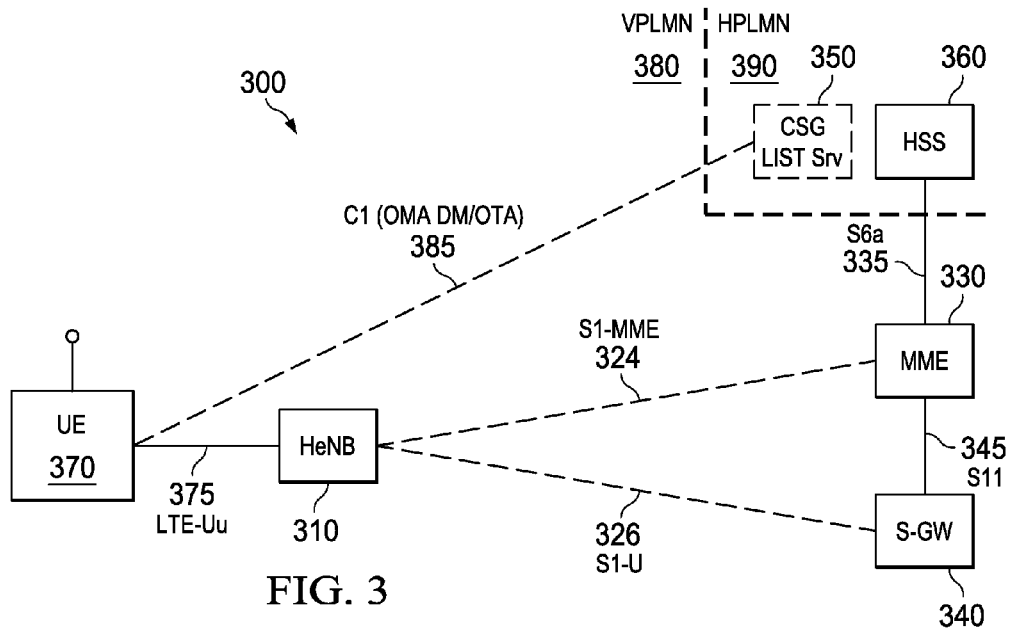
FIG. 3 is a schematic diagram of another example logical architecture for use in a HeNB cell in which the network does not include a dedicated HeNB GW.
Figure 4:
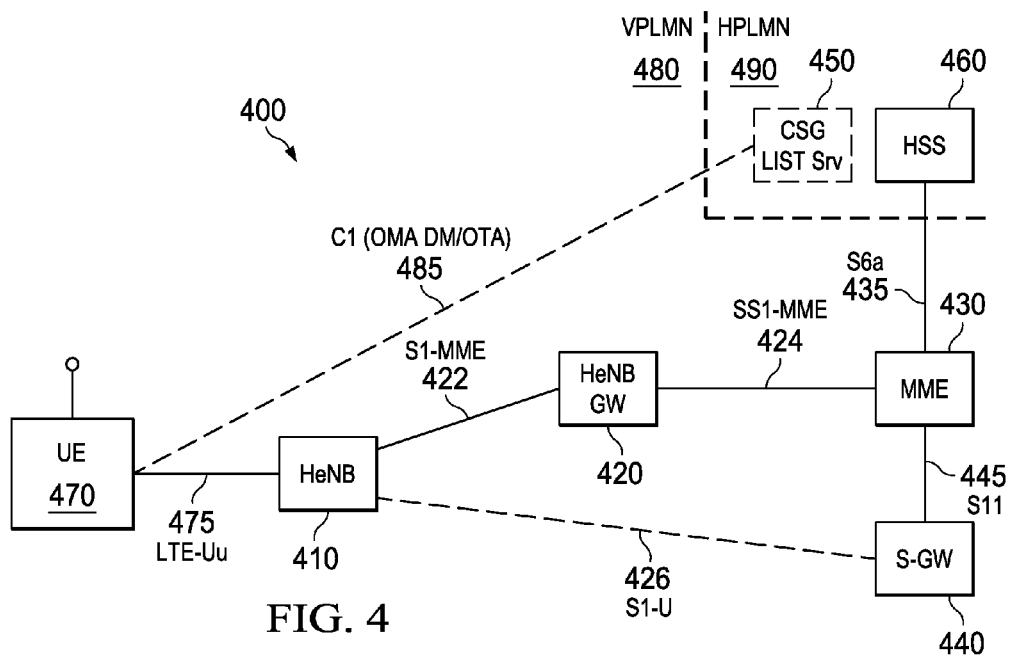
FIG. 4 is a schematic diagram of a further example logical architecture for use in a HeNB cell in which the network includes a HeNB GW for the C-Plane.
Figure 5:
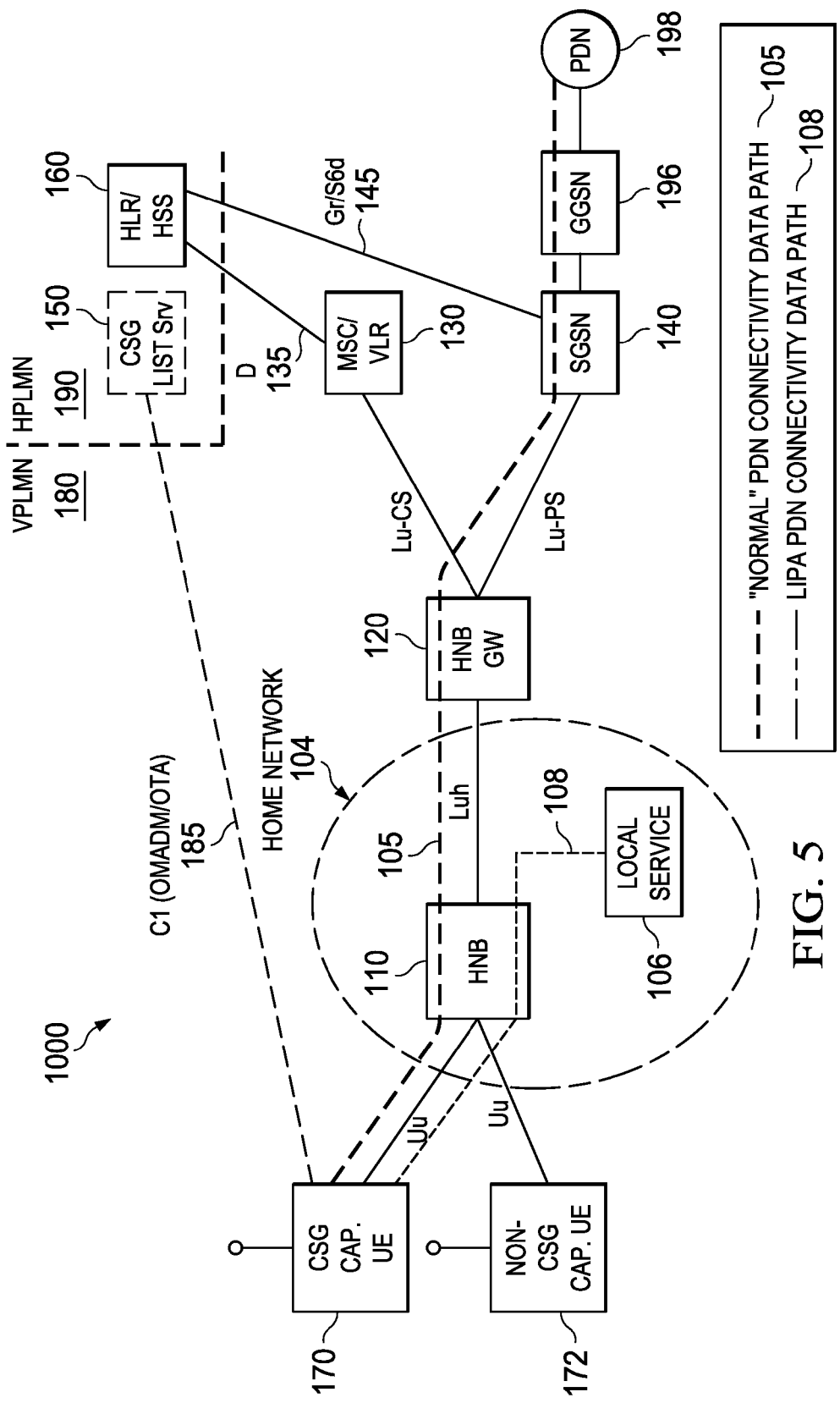
FIG. 5 is a schematic diagram of an example logical architecture for use in a HNB cell illustrating Local IP connectivity.
Figure 6:
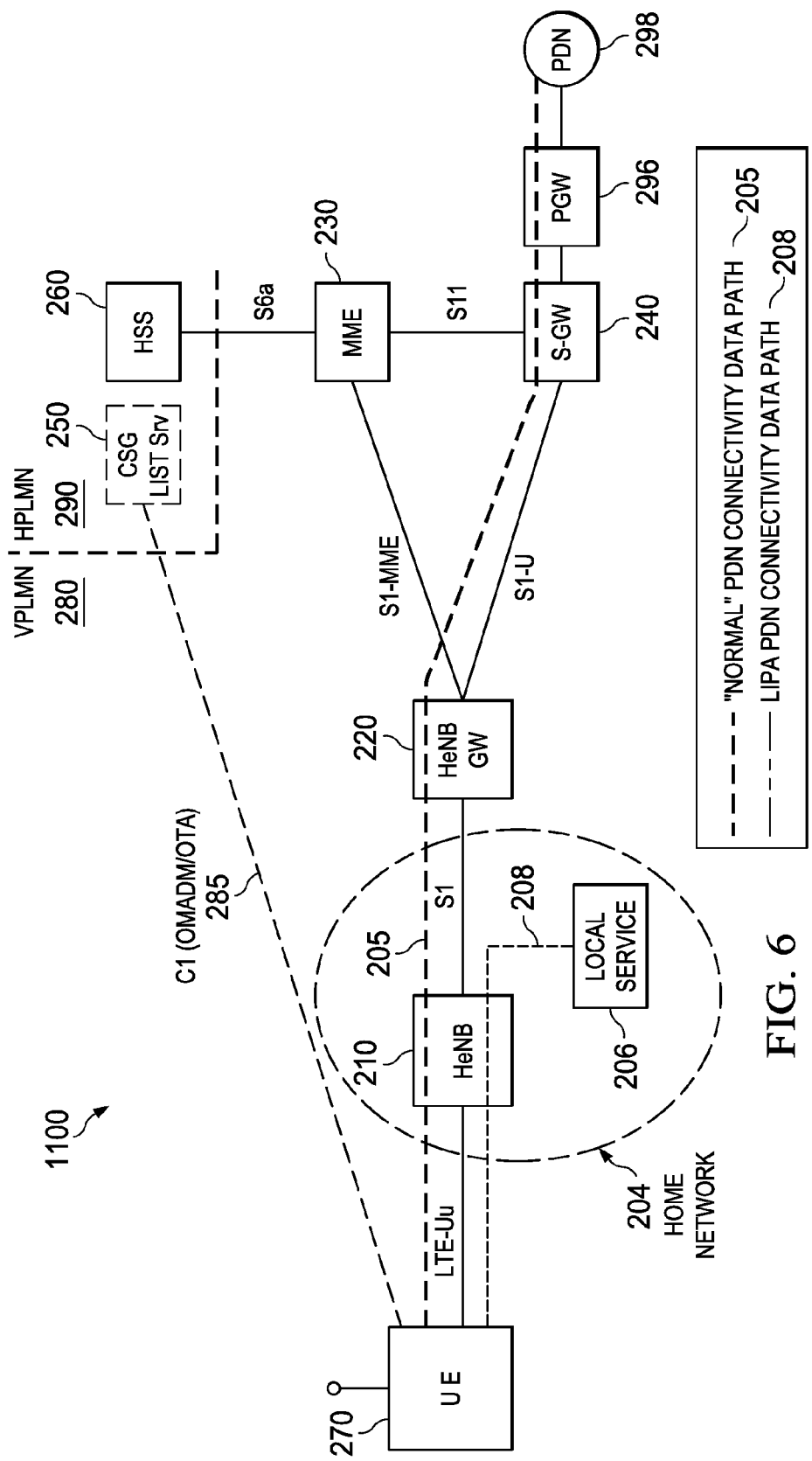
FIG. 6 is a schematic diagram of the example logical architecture for use in a HeNB cell illustrating Local IP connectivity.
Figure 7:
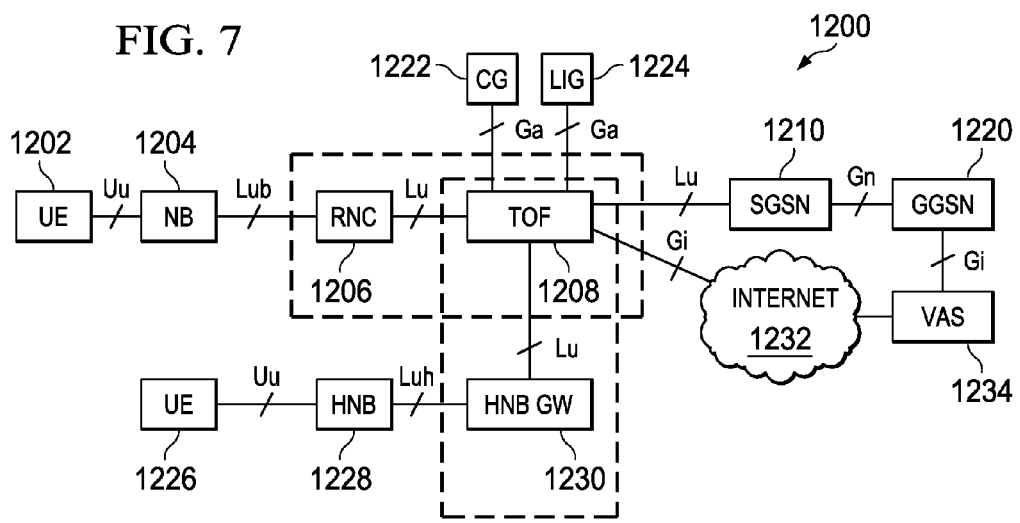
FIG. 7 is a schematic diagram of an example logical architecture for deploying Selected IP Traffic Offload at Iu-PS.

A method, system and device are provided for managing LIPA and/or SIPTO connection releases when UE moves out of residential/enterprise network coverage in case service continuity is not supported for the LIPA/SIPTO PDN connection(s). In selected embodiments where a UE has only one PDN connection which is LIPA PDN connection, automatically releasing it when the UE leaves the residential/enterprise network coverage will cause the UE to be detached from the network as the UE does not have a PDN connection. To address problems caused by not providing service continuity for LIPA/SIPTO PDN connection(s), the PDN connection/PDP context created in the HeNB/HNB by the MME/SGSN includes context information related to the UE indicating whether such connection is a LIPA PDN connection PDN connection or not. In addition, each UE may be configured to reconnect (or not reconnect) to the PDN corresponding to a certain APN or service if the PDN connection was disconnected by the network due to mobility from a H(e)NB (where the UE was connected in LIPA to such PDN) to a target cell (where LIPA continuity is not provided). In selected embodiments, the UE can be configured to contain (1) an indication of whether any PDN that was disconnected due to lack of LIPA service continuity needs to be reconnected, (2) a list of APNs for which the PDN needs to be reconnected if the PDN that was disconnected due to lack of LIPA service continuity, (3) an indication of availability of LIPA service continuity, (4) a list of indicators for PDN connection with certain characteristics, (5) an indication of whether disconnecting non-LIPA is allowed if emergency call with insufficient credentials is not allowed, and/or (6) an indication of whether a UE must retain at least two PDN connections with one of the PDN connections being to either a particular APN or to a default APN.

Various illustrative embodiments of the present disclosure will now be described in detail with reference to the accompanying figures. While various details are set forth in the following description, it will be appreciated that the present disclosure may be practiced without these specific details, and that numerous implementation-specific decisions may be made to the disclosure described herein to achieve the device designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram and flow chart form, rather than in detail, in order to avoid limiting or obscuring the present disclosure. In addition, some portions of the detailed descriptions provided herein are presented in terms of algorithms or operations on data within a computer memory. Such descriptions and representations are used by those skilled in the art to describe and convey the substance of their work to others skilled in the art. Various illustrative embodiments of the present disclosure will now be described in detail below with reference to the figures.

Ongoing 3GPP discussions have addressed the treatment of LIPA/SIPTO PDN connection releases associated with UE mobility. In these discussions, there is currently a preference to not provide service continuity for a LIPA PDN connection if the UE moves out of the coverage of the residential/enterprise network, and instead to release the LIPA PDN connection. This preference for releasing connections is based on a number of factors. First, there is a concern that lawful Interception will be applied to local IP resource access if the UE resides in macro (e)NB's coverage and service continuity is maintained. Also, it will be difficult to establish charging schemes which change as the UE moves from H(e)NB to macro (e)NB. There may also be authentication complications involved with maintaining service continuity. Based on these discussions, Release 10 of 3GPP S1-100316 entitled "Mobility for Local IP Access (LIPA)" and of 3GPP S1-100321 entitled "SIPTO requirements common for macro network and H(e)NB subsystems" specifies that mobility of a LIPA connection to macro network is not supported, whereas mobility of the LIPA connection between H(e)NBs in the same residential/enterprise network is supported/required. In addition, Release 10 of 3GPP S1-100321 entitled "SIPTO requirements common for macro network and H(e)NB subsystems" specifies that mobility of a SIPTO connection within the macro network shall be supported, and mobility from H(e)NB to macro and between H(e)NB may be supported.

In view of the preference against maintaining service continuity for LIPA connections when the UE leaves the residential/enterprise network coverage, there are a number of different problems created resulting in unwanted UE disconnections. As explained more fully below, these release problems have multiple dimensions, including problems with PS services when there is UE mobility in connected mode, problems triggered by CSFB procedures when there is UE mobility in connected mode, and problems with or without ISR when there is UE mobility in idle mode. In discussing these problems, consideration should be given to LIPA mechanisms which also work for pre-Release 10 UEs (i.e., UEs that are not aware of LIPA connectivity, such as occurs when the network provides LIPA connectivity to the UE based on subscription profile or network decision, without the UE being aware of such decision). For such UEs, NAS signaling and mechanism cannot be modified in order to resolve the identified problems.

Figure 9:
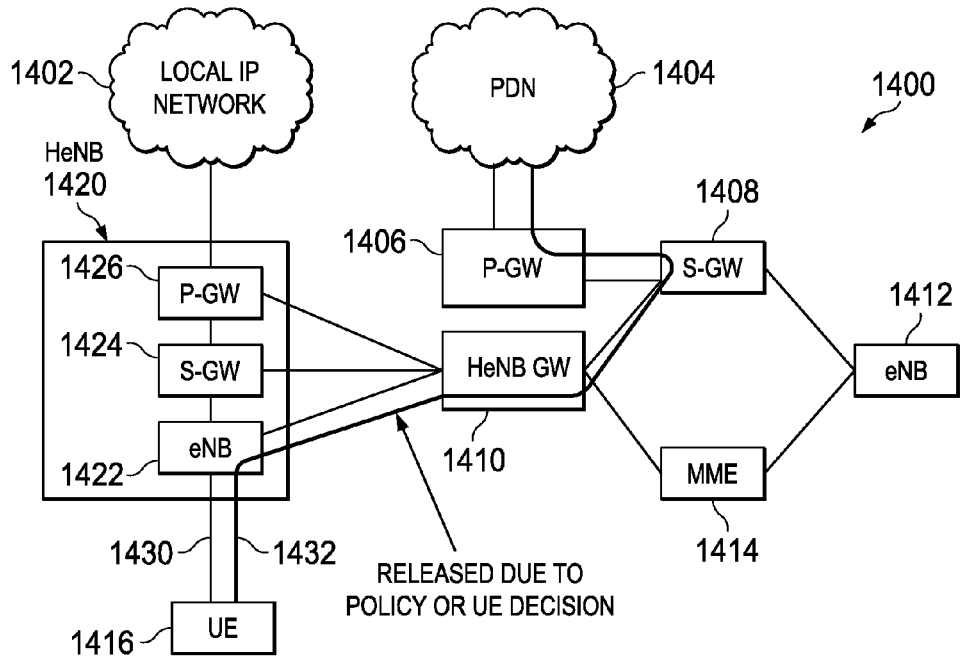
FIG. 9 is a schematic diagram of traffic flows in an HeNB subsystem in which the UE has at least a LIPA PDN connection.
Figure 10:
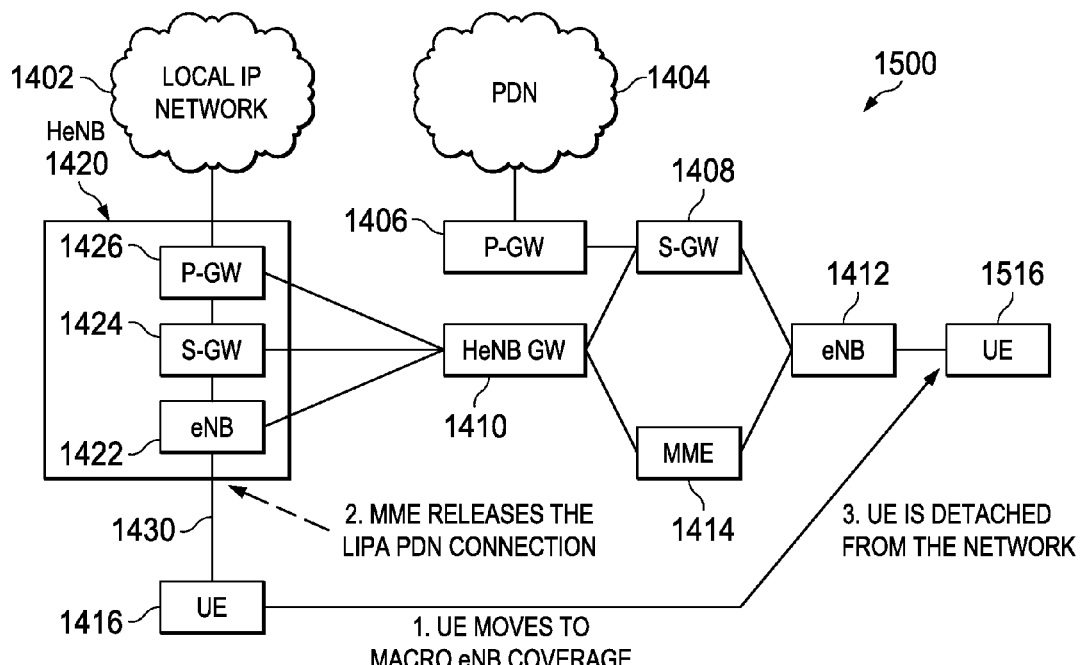
FIG. 10 is a schematic diagram of traffic flows in an HeNB subsystem in which the UE moves outside of HeBN coverage.

For purposes of illustrating the UE disconnect problem, reference is now made to FIGS. 9-10 which schematically illustrate the release of a LIPA PDN connection as the UE moves outside the HeNb enterprise network coverage, where the term "PDN connection" refers both to a PDN Connection involving a HeNB and a PDP Context involving a HNB unless explicitly indicated. In particular, FIG. 9 is a schematic diagram of traffic flows in an HeNB subsystem 1400 in which the UE 1416 has a LIPA/SIPTO PDN connection 1430 and a core network (CN) PDN connection 1432. With the LIPA/SIPTO PDN connection 1430 established, user plane traffic for LIPA and SIPTO does not go through the core network connection 1432. Instead, the traffic goes from UE 1416 through the Local eNB 1422, Local S-GW 1424, and Local P-GW 1426, which are illustrated to all be collocated in HeNB 1420, as indicated with line 1430. If the UE 1416 has an additional, non-LIPA, non-SIPTO PDN connection, the traffic goes through the HeNB-GW 1410, S-GW 1408, and P-GW 1406 to the core PDN 1404 as indicated with line 1432. Since the second PDN connection 1432 can be released at any time (e.g., due to pre-defined policy or UE configuration), there are times when the UE 1416 has only one PDN connection when connected to the H(e)NB 1420, and such PDN connection is a LIPA PDN connection 1430.

To illustrate the UE disconnect problem, reference is now made to FIG. 10 which depicts a schematic diagram of traffic flows in an HeNB subsystem 1500 in which the UE 1416 moves outside of HeNB coverage when it has only a LIPA PDN connection. In this case, the reference to moving "outside the H(e)NB" indicates both case of the UE moving from a H(e)NB cell to macro cell coverage, and the case of the UE moving between H(e)NB cells for which LIPA PDN continuity is not supported (e.g. H(e)NBs with different CSGs). It may be that LIPA PDN continuity is not supported between any H(e)NB cell. Thus, FIG. 10 illustrates that the UE 1416 moves towards a second position 1516 where there is macro coverage, though the UE 1416 could also move to another H(e)NB for which LIPA PDN continuity is not supported. As soon as the MME 1414 detects that the UE is not connected to the H(e)NB 1420 (e.g. the UE has moved to a different cell where LIPA continuity is not supported), the MME 1414 releases the LIPA PDN connection 1430 since there is no requirement of maintaining LIPA PDN connectivity. As a result, there is no PDN connection for the UE 1516. As described more fully below, the MME 1414 can detect that the UE 1516 is out of coverage of the H(e)NB 1420 based on a variety of detection mechanisms, such as when the UE 1516 performs a Tracking Area Update (TAU) or Routing Area Update (RAU) from a different cell, or when the UE 1516 responds to paging from a different cell, etc.

In E-UTRAN, a UE has to maintain at least one PDN connection for the UE to be considered attached to the network. If there is no PDN connection, the UE is detached from the network. FIG. 10 shows how the disconnect problem arises when a UE 1416 has only a single, active LIPA PDN connection 1430, and the MME 1414 releases the LIPA PDN connection 1430 upon detecting that the UE 1416 has moved to a new position which is not connected to the H(e)NB 1420 anymore. When detachment occurs, the UE 1516 may not know why it is being detached and why the LIPA PDN connection 1430 is being released, and is then forced to re-attach to the network. This issue applies both for NAS idle mode mobility and NAS connected mode mobility. As will be appreciated, while the foregoing discussion refers to LIPA PDN connections, the same challenges apply to a LIPA PDP Context (in case of HNB) or the SIPTO Local connectivity, unless explicitly indicated. And though not explicitly shown, it will also be appreciated that similar problems arise when UE mobility is from the H(e)NB 1420 towards GERAN/UTRAN (i.e. involving a SGSN), in which case the active PDP context (corresponding to the LIPA connection) needs to be deactivated, even if the UE does not need to be detached.

In this framework, a number of problem cases associated with LIPA connection releases are identified and discussed in relation to FIG. 10 more fully below. In addition, solutions for managing the various connection release problems are identified and discussed as set forth below.

Mobility In Connected Mode. There are a number of problem cases that arise in the case of an active handover where the UE has NAS connected mode mobility.

In an example problem case, a connected mode UE 1416 has a LIPA PDN connection or SIPTO connectivity/SIPTO PDN connection 1430. As the connected mode UE 1416 moves out of the HeNB coverage 1420 (which is directly connected to the residential/enterprise network 1402) to a second position 1516 at a target E-UTRAN cell (e.g., eNB cell 1412 or another HeNB cell for which LIPA continuity is not supported), the source HeNB 1420 makes a decision to handover (HO) the UE to the target cell 1412 based on the measurement reports from the UE 1516. The HeNB 1420 sends a HO REQUIRED message to the MME 1414. As the HO REQUIRED message contains a Target ID, the MME 1414 determines that LIPA/SIPTO service shall not be continued at the target cell 1412 (e.g. based on the fact that the target cell is a macro cell or a H(e)NB in a different CSG). Based on this determination, the MME 1414 must release the LIPA/SIPTO PDN connection 1430, but the existing specifications do not specify how the MME 1414 handles the LIPA/SIPTO PDN connection release.

In another problem case, a connected mode UE 1416 moves from HNB cell or coverage (not shown) to a target (e.g. GERAN/UTRAN) cell for which LIPA PDN continuity is not provided. An example would occur when UE is in HNB coverage and it has LIPA/SIPTO PDP context. If service continuity is not supported, the PDP context will be released when the SGSN detect that the UE moved out of HNB's coverage. However, the context information between network (SGSN) and UE containing information on the active PDN connections/PDP contexts might be out of synch for a while until a new RAU is performed and the context is synchronized between the UE and the SGSN. Due to the out-of-sync context, the UE in the meanwhile considers the PDP context corresponding to the LIPA connection still active.

Mobility for NAS-Idle UE. There are a number of problem cases that arise when the LIPA connection is disconnected during idle mode mobility and the UE enters NAS connected mode after performing idle mobility outside the H(e)NB.

In a first problem case, the UE 1416 moves from a HeNB cell coverage 1420 to a second position 1516 at a target cell 1412 (e.g., an eNB or an HeNB cell) for which continuity shall not be provided. After moving to the target cell, the UE 1516 may perform a SERVICE REQUEST in a target (e.g., an E-UTRA) cell which is not directly connected to the residential/enterprise network. On receiving SERVICE REQUEST (SR) from the UE via the target cell, the MME 1414 determines it cannot service the SR and needs to release the LIPA PDN connectivity 1430. The MME 1414 releases the LIPA PDN connectivity 1430 by rejecting the service request and disconnecting the LIPA PDN connectivity if the UE has other active PDN connections. On the other hand, if the UE has only LIPA PDN connection before it enters ECM-IDLE mode, a release of the LIPA PDN connection results in UE not having any active PDN connections left, resulting in the UE being detached from the network by the MME without the UE being correctly informed since the current specifications do not require that the MME indicate why the UE is being detached.

In another problem case, the UE 1416 moves from a HeNB 1420 to GERAN/UTRAN (not shown). In this case, the IDLE mode UE performs Tracking Area Update (TAU) in an E-UTRAN cell where LIPA service continuity is not provided. In particular, the UE will perform TAU in IDLE mode when (1) the UE enters into a new Tracking Area (TA) that is not in the list of TAIs that the UE obtained from the MME at the last registration (attach or TAU); and (2) the periodic TA update timer has expired. If the target cell is not directly connected to the residential/enterprise network when the UE performs the TAU, the MME needs to disconnect the active LIPA PDN connection, but the current specifications do not specify how the MME behaves in the presence of LIPA connections since the MME needs to release such PDN connections.

In another problem case, the UE moves from a HNB to GERAN/UTRAN. In this case, the IDLE mode UE (which has at least one LIPA PDN connection through HeNB) performs a Routing Area Update. In particular, the UE performs RAU when the UE enters into a new Routing Area (RA), and when the RAU timer expires. The new SGSN sends a CONTEXT REQUEST message to the old MME during the RAU, and the MME responds with a CONTEXT RESPONSE message. Upon determining that the UE has moved to a cell for which LIPA PDN continuity cannot be supported, the network disconnects the LIPA connection, but the current specifications do not specify whether the MME or SGSN shall trigger the disconnection and how.

Delay In Discovery Loss of Connectivity in Active Idle Mobility. There are a number of problem cases that arise from idle mode mobility when there is a delay in discovering that connectivity has been lost, with or without Idle mode Signaling Reduction (ISR).

In an example problem case, the UE 1416 moves between a HeNB 1420 and an eNB 1412, or between a HNB and macro GERAN/UTRAN, or between HeNBs (respectively HNBs) belonging to different CSGs and for which LIPA continuity shall not be provided. If the UE moves in idle mode within the Routing Area (RA)/Tracking Area (TA), the UE does not perform NAS signaling to register its location with the network. If there is a significant delay before the UE performs any NAS signaling or the UE transmits data, the UE does not realize it has lost connectivity, which can be a problem, such as for push services when the data to be delivered to the UE cannot be delivered.

In another problem case, the UE moves from a HeNB to a GERAN/UTRAN cell where ISR is active. When idle mobility is performed by the UE from the H(e)NB to a cell for which LIPA PDN connectivity shall not be supported and ISR is active and the UE moves within the ISR area, the UE does not perform NAS signaling to register its location with the network, and therefore it may be a long time before the UE performs any NAS signaling (unless it needs to transmit data) and before the UE realizes it has lost connectivity. Such loss of connectivity can be a problem for push services since the data to be delivered to the UE cannot be delivered. In addition, if the UE was using a push-service that used the LIPA PDN connection or was using the default bearer of the LIPA PDN connection to transport the data to the UE, the UE will not be able to receive any pushed data until it realizes it has been disconnected and until it has performed recovery action, such as re-attaching. Since a RAU (that will synchronize the UE and the SGSN contexts) or keep alive mechanisms of the push-service may happen long after idle mode mobility, the UE will not receive any data pushed from the push-service, whereas if the UE had been informed of the disconnection of the LIPA PDN, it could have reconnected to the push service as appropriate from the target cell with a new PDP context.

Delay In Discovery Loss of Connectivity in Active Mode Mobility. There are a number of problem cases that arise from active mode mobility when there is a delay in discovering that connectivity has been lost.

In an example problem case, the UE in connected mode moves from HeNB to GERAN/UTRAN when ISR is active, resulting in a delay in discovery of loss of connectivity. This problem exists if a UE that performed the inter-RAT HO and finds itself without RABs for a given PDP context is allowed to still consider the PDP context active. When handover is performed by a UE that is active for a non-LIPA PDN from the H(e)NB cell coverage to a target (e.g., GERAN/UTRAN) cell wherein LIPA PDN connectivity is not supported, the PDP context corresponding to the LIPA PDN connection is disconnected. When ISR is active, the UE will not perform the RAU at the end of the handover if the handover is towards a RA in the ISR area. However, unless the UE is informed immediately, the UE may believe the PDP context corresponding to the LIPA PDN is still connected since, even if there are no RABs active for such connection, the UE still believes the PDP context is active. If the UE was using some push-service over the LIPA PDN connection, the UE will not be able to receive any pushed data until it realizes it has been disconnected. Also, since a RAU (that will synchronize the UE and the SGSN contexts) or keep alive mechanisms of the push-service may happen after a long-while from the handover, the UE will lose any data pushed from the push-service, whereas if the UE had been informed of the disconnection of the LIPA PDN, it could have reconnected to the push service as appropriate from the target cell with a new PDP context.

In another problem case, the UE in connected mode moves from HNB cell coverage to macro (e.g. GERAN/UTRAN) cell coverage, resulting in delay in discovery of loss of connectivity. If the UE performs handover from HNB to a target GERAN/UTRAN cell wherein LIPA PDN connectivity is not supported, the PDP context is disconnected. However, the UE may not perform a RAU as part of the handover, in which case the UE and the SGSN are not synchronized with respect to the active PDP context information.

Delay In Disconnection For Idle Mode Mobility. There is a timing-related problem which is orthogonal to the other problem cases, and the solution may benefit both idle mode mobility and active mode mobility. In this case, when the UE 1416 moves outside the coverage of the H(e)NB 1420, the LIPA connection is released upon detection, and then re-established when the UE 1416 moves back within the coverage of the H(e)NB 1420. However, there may be situations where the UE 1416 may return to the H(e)NB 1420 soon, or may keep moving back and forth between the H(e)NB 1420 and the macro coverage. In these scenarios, the LIPA connection will be established and released repeatedly, resulting in significant signaling overhead. As a result, it may be desirable to delay the release of the LIPA connection when the UE 1416 moves outside the coverage of the H(e)NB 1420 in order to optimize the scenario where the UE 1416 returns to the H(e)NB 1420 relatively quickly.

Descriptions of Embodiments

In view of the foregoing problems associated with LIPA connection releases, there are described and disclosed herein a number of solutions that may be applied to manage the identified connection release problems. For example, MME-initiated PDN connection release procedures may be combined with handover procedures for releasing a PDN connection when the UE moves outside the coverage of the H(e)NB in most cases (and similarly the SGSN-initiated PDP context deactivation procedure). However, there are other solutions disclosed hereinbelow wherein, upon creation of a PDN connection/PDP context in a HeNB/HNB, the MME/SGSN stores in the context information related to the UE an indication of whether such connection is a LIPA PDN connection PDN connection or not. In addition, the solutions include configuring the UE (e.g. by the operator or the user) on whether to reconnect the PDN corresponding to a certain APN or service if, due to mobility from a H(e)NB where the UE was connected in LIPA to such PDN to a target cell for which LIPA continuity is not provided, such PDN connection was disconnected by the network. Alternatively, the UE may be configured to not reconnect the PDN that was disconnected due to UE mobility.

In selected embodiments, when the UE activates a LIPA PDN connection, the MME stores the pair of CSG ID and the APN for the LIPA PDN connection where a LIPA PDN connection is activated at the CSG ID cell. In other embodiments, when the UE activates a LIPA PDP context, the SGSN stores the pair of CSG ID and the APN for the LIPA PDP context where the LIPA PDP context is activated at the CSG ID cell. In some embodiments, the UE activating a LIPA PDN connection or the UE activating a LIPA PDP context includes the UE sending a PDN connection request to the MME or the MME receiving a PDN connection request from the UE or the UE sending an attach request to the MME or the MME receiving an attach request from the UE or the UE sending a PDP context request to the SGSN or the SGSN receiving a PDP context request from the UE.

As used herein, a LIPA PDN connection is a PDN Connection that the MME authorizes for connectivity to a PDN GW for a UE connected to a HeNB based on a request from the UE for LIPA connectivity and based on the CSG ID of the HeNB. Alternatively, a LIPA PDN Connection is a PDN Connection which was activated by the UE requesting LIPA connectivity type "LIPA" and the MME informing the UE of the connectivity type provided.

In some embodiments, the TAU procedure is initiated by the UE and is used for a number of purposes, including synchronizing the UE EPS bearer context with the MME EPS bearer context for UE mobility where the source cell is a CSG cell and the target cell is not a CSG cell, when the UE has at least one LIPA PDN connection. The TAU procedure is also used to synchronize the UE EPS bearer context with the MME EPS bearer context for UE mobility where the source cell is a CSG cell and the target cell is a CSG cell, and where the target cell's CSG-ID is not the source cell's CSG-ID, when the UE has at least one LIPA PDN connection.

In accordance with selected embodiments, another solution addresses the case of connected mode mobility from HeNB to macro E-UTRAN or another HeNB for which LIPA continuity is not supported. In this solution, the MME implicitly deactivates the LIPA PDN connection during the handover between a HeNB and a target E-UTRAN cell when LIPA continuity shall not be supported. Alternatively, the MME explicitly deactivates the LIPA PDN connection after the handover is performed. In this solution, the UE detects that it has lost LIPA PDN connection since the RABs for that PDN will not be present in the target cell.

The applied assumptions in this case are that (1) Service Continuity for the LIPA is not supported, (2) UE is in ECM-CONNECTED mode, (3) HO should be performed due to the UE's mobility, (4) Target cell belongs to a macro eNB or another HeNB that is not connected to the residential/enterprise network (other CSG), (5) MME relocation is not involved, and (6) UE has at least two PDN connections: one is LIPA PDN connection another is a PDN connection through core network.

The disclosed solutions in these embodiments provide a way to handle S1 based HO procedure between HeNB and the target E-UTRAN cell when the UE has at least one LIPA/SIPTO PDN connection and additional PDN connections going through the core network. If MME relocation is needed for the HO, MME relocation happens right after step 16-1 (described in FIG. 11), and it does not affect the rest of the procedure.

Implicit Deactivation of the LIPA PDN Connection During the Handover

In a first embodiment described with reference to the signal flow diagram in FIG. 11 where the UE 1602 has one of the PDN connections that is a LIPA/local SIPTO connection, the MME 1608 performs the handover, but the MME 1608 does not allow the allocation of RABs for the LIPA PDN connection in the target cell. The MME 1608 does not perform any explicit NAS signaling to the UE 1602 to deactivate the LIPA PDN connection. After the handover, the UE 1602 automatically releases the LIPA PDN connection since no RABs have been allocated for it. For Rel.10 UEs and subsequent releases, the UE detects that the PDN connection for which no RABs have been allocated is the LIPA connection and decides whether to request a new PDN for that APN based on policies or configuration information, such as may be provided by the operator or the user.

In operation, when the HeNB 1604 triggers the handover to a target cell by sending the handover request to the MME 1608 which includes the information on the target cell, the MME 1608 determines that there is an active PDN connection that is a LIPA PDN connection based on the UE context information in the MME (including subscription information with LIPA indications, current CSG, current status of LIPA connections, etc.) and the information on the target cell (e.g. technology type, CSG ID). In addition, the MME 1608 determines that LIPA PDN continuity cannot be supported towards the target cell. To implicitly deactivate the connection, the MME 1608 does not request the allocation of RABs for the LIPA PDN connection in the target cell during the handover preparation. In this way, the UE 1602 performs the handover and detects that no radio bearers have been allocated in the target cell for the LIPA PDN connection. In this way, the UE 1602 determines that the LIPA PDN connection has been released. In addition, the UE 1602 determines whether the PDN connection needs to be reactivated in the target cell based on configuration information or operator policies or user policies.

Figure 11:
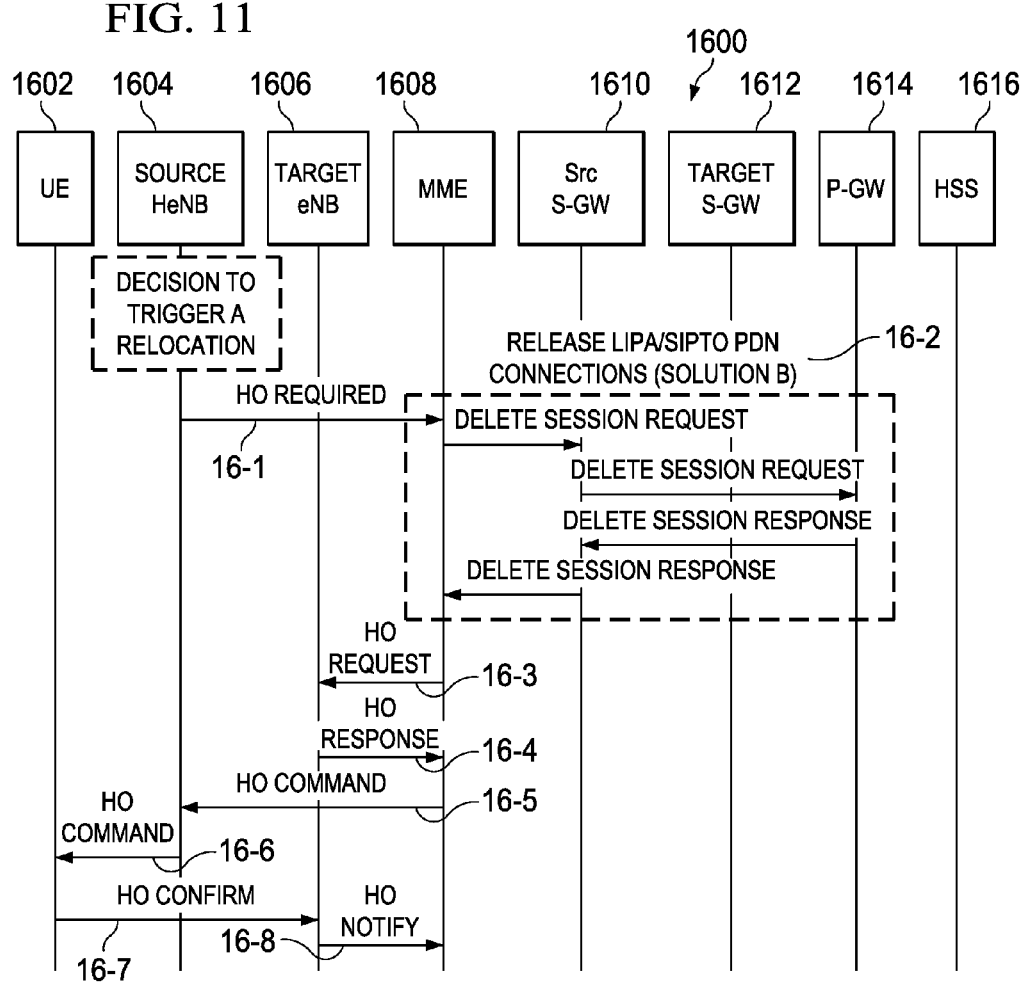
FIG. 11 is a signal flow diagram illustrating a LIPA/SIPTO PDN disconnect procedure during handover from an HeNB to a target E-UTRAN cell when the UE has at least one LIPA/SIPTO PDN connection and additional PDN connections going through the core network.
Figure 8:
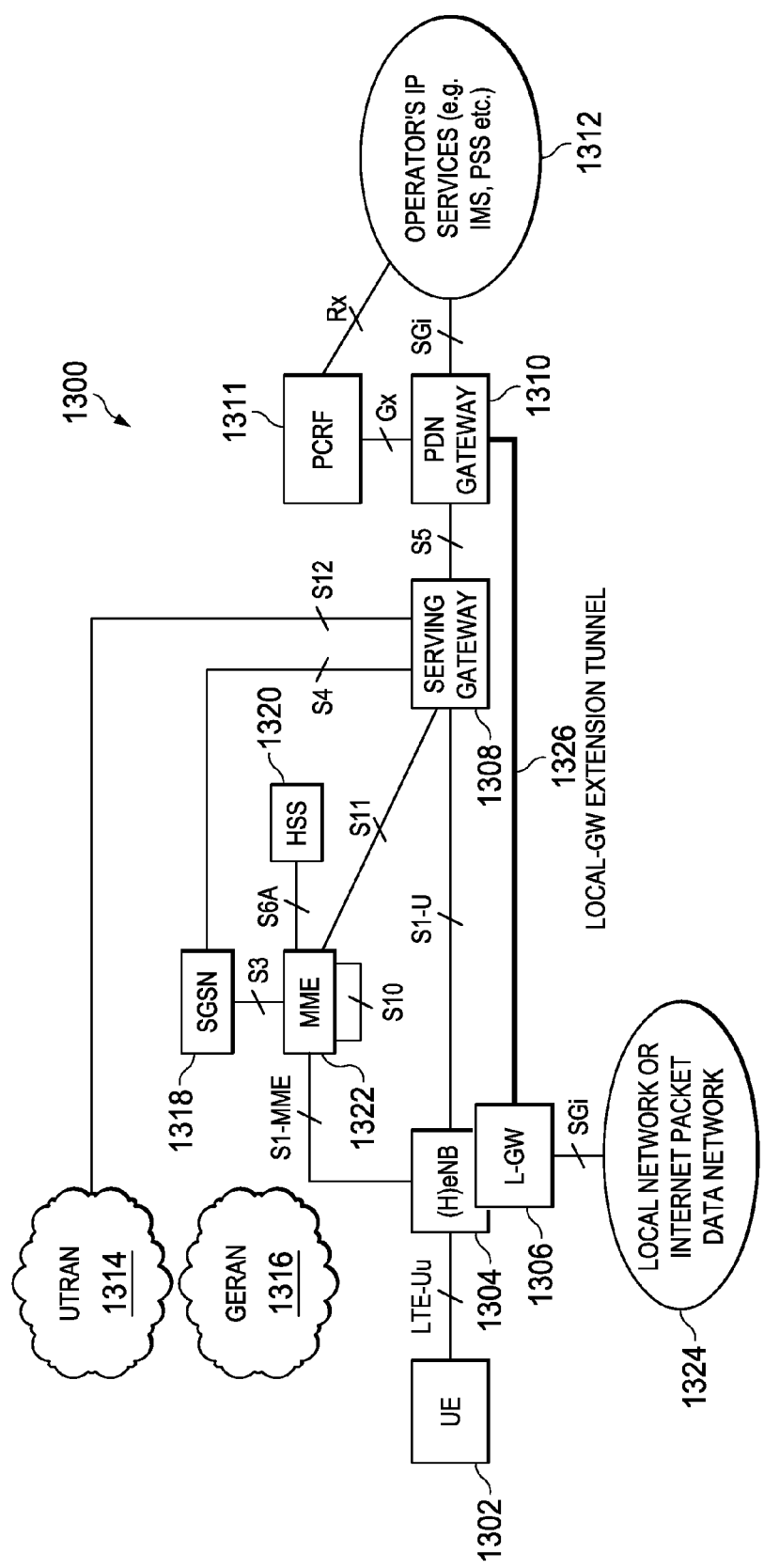
FIG. 8 is a schematic diagram of an example logical architecture for a proposed extension of non-roaming architecture for 3GPP accesses for SIPTO and LIPA.

In the depicted signal flow 1600 shown in FIG. 11, the first or source HeNB 1604 sends Handover Required (Direct Forwarding Path Availability, Source to Target transparent container, target eNB Identity, target TAI, SLAP Cause) to the MME 1608 at signal flow 16-1. At signal flow 16-2, MME 1608 determines that service continuity is not supported for the LIPA/SIPTO PDN connection, and the MME 1608 initiates PDN disconnection procedure for all the LIPA/SIPTO PDN connections.

At signal flow 16-3, the MME 1608 sends a Handover Request (EPS Bearers to Setup, AMBR, S1AP Cause, Source to Target transparent container, Handover Restriction List) message to the target eNB 1606. This message does not contain the EPS bearers belonging to the released LIPA/SIPTO PDN connections. This message creates the UE context in the target eNB 1606, including information about the bearers, and the security context. For each EPS Bearer, the Bearers to Setup includes Serving GW address and uplink TEID for user plane, and EPS Bearer QoS. In reply, the target eNB 1606 sends a Handover Request Acknowledge (EPS Bearer Setup list, EPS Bearers failed to setup list Target to Source transparent container) message to the MME 1608 at signal flow 16-4. The EPS Bearer Setup list includes a list of addresses and TEIDs allocated at the target eNB for downlink traffic on S1-U reference point (one TEID per bearer) and addresses and TEIDs for receiving forwarded data if necessary.

At signal flow 16-5, the MME 1608 sends a Handover Command (Target to Source transparent container, Bearers subject to forwarding, Bearers to Release) message to the HeNB 1604. The Bearers subject to forwarding includes list of addresses and TEIDs allocated for forwarding. The Bearers to Release includes the list of bearers to be released.

At signal flow 16-6, the HeNB 1604 constructs and sends the Handover Command to the UE 1602 using the Target to Source transparent container. Upon reception of this message, the UE 1602 will remove any EPS bearers for which it did not receive the corresponding EPS radio bearers in the target cell. After the UE 1602 has successfully synchronized to the target cell, it sends a Handover Confirm message to the target eNB 1606 at signal flow 16-7. Downlink packets forwarded from the HeNB 1604 can be sent to the UE 1602. Also, uplink packets can be sent from the UE 1602, which are forwarded to the target Serving GW 1612 and on to the PDN GW 1614. Finally, the Target eNB 1606 sends a Handover Notify (TAI+ECGI) message to the MME 1608 at signal flow 16-8.

Explicit Deactivation of the LIPA PDN Connection after the Handover

In a second embodiment described with reference to the signal flow diagram in FIG. 11 where the UE 1602 has a LIPA connection, the MME 1608 performs the regular handover, but deactivates the LIPA PDN connection by triggering an MME-initiated PDN disconnection with an indication identifying the LIPA PDN, where the indication may also provide a specific reason/cause. The MME 1608 may do so during the handover or after the handover is performed. If no specific cause is provided, the Rel. 10+ UE detects that this is the LIPA connection and requests a new PDN for that APN, either automatically or based on policies. If a specific cause is given, the UE reacts based on policies.

In operation, when the HeNB 1604 triggers the handover to a target cell by sending the handover request to the MME 1608 which includes the information on the target cell, the MME 1608 determines that there is an active PDN connection that is a LIPA PDN connection based on the UE context information in the MME (including subscription information with LIPA indications, current CSG, current status of LIPA connections, etc.) and the information on the target cell (e.g. technology type, CSG ID). In addition, the MME 1608 determines that LIPA PDN continuity cannot be supported towards the target cell. To explicitly deactivate the connection, the MME 1608 triggers the handover and, upon handover completion, the MME 1608 deactivates the LIPA PDN connections by triggering an MME-initiated PDN disconnection. The MME 1608 may include a specific reason/cause for the de-activation.

Figure 12:
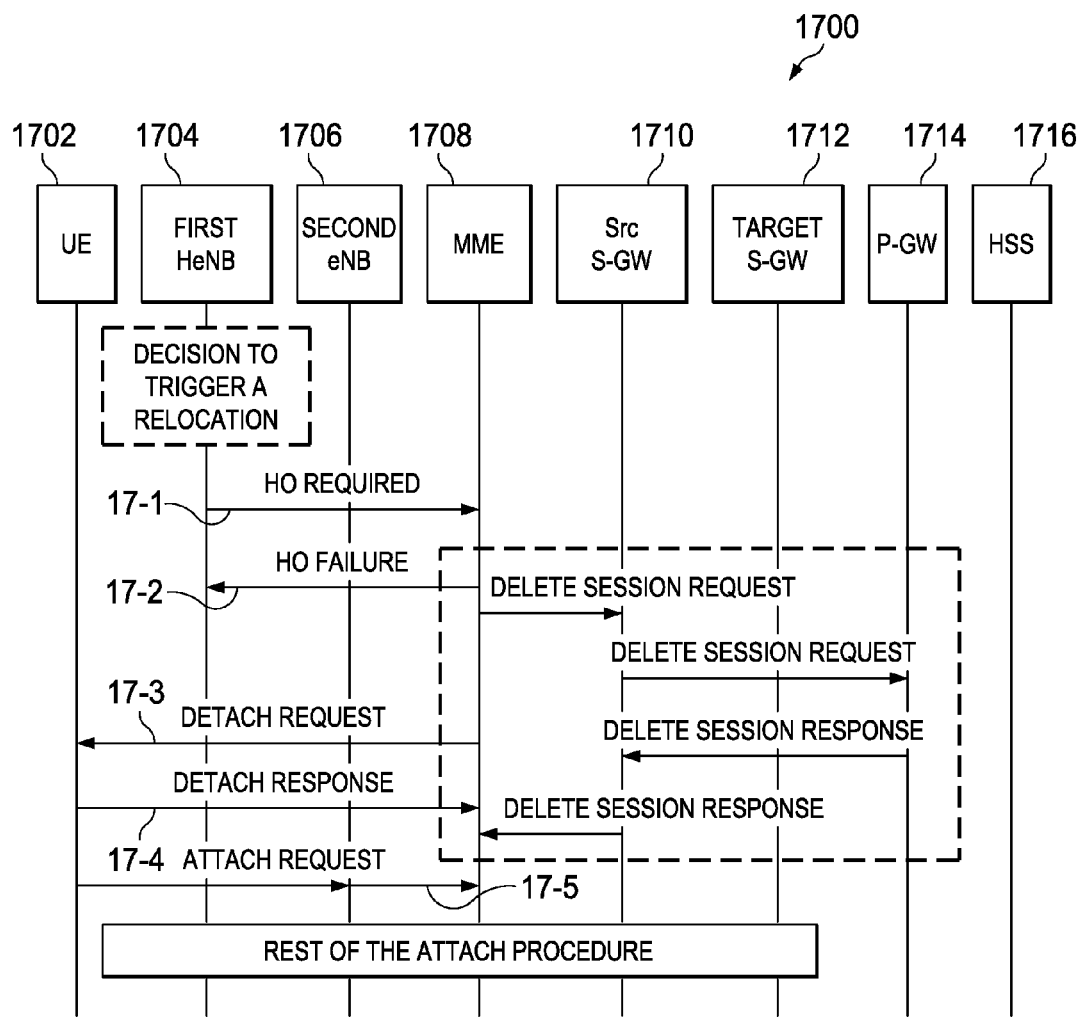
FIG. 12 is a signal flow diagram illustrating a LIPA/SIPTO PDN disconnect procedure for implicitly detaching the UE upon receiving a handover request at the MME which releases the PDN connections and sends a Detach Request message to UE.

FIG. 12 further describes a proposed solution for connected mode mobility from HeNB to macro E-UTRAN or another HeNB for which LIPA continuity is not supported. In this solution, instead of proceeding with HO procedure, the MME 1708 rejects the HO request from the source HeNB 1704, releases the PDN connections, and sends a DETACH REQUEST message to UE 1702 based on the awareness that all the active PDN connections are connections for which service continuity is not provided and the information on the target cell (e.g. technology type, CSG ID). As a result, the UE 1702 may re-attach. This solution includes the MME 1708 being "aware" of the presence of the LIPA PDN connection when performing the handover.

The applied assumptions in this case are that (1) all the PDN connections that UE has active are LIPA or SIPTO PDN connections, (2) Service Continuity for the LIPA is not supported, (3) UE is in ECM-CONNECTED mode, (4) HO is required due to the UE's mobility, (5) Target cell belongs to a macro eNB or another HeNB that is not connected to the residential/enterprise network (other CSG), and (6) MME relocation is not involved.

The disclosed solutions in these embodiments manage the release of LIPA/SIPTO PDN connections in case of handover, but instead of proceeding with HO procedure, the MME rejects the HO request from the source HeNB, releases the PDN connections, and sends a DETACH REQUEST message to the UE, all based on the awareness that all the active PDN connections are connections for which service continuity is not provided and the information on the target cell (e.g. technology type, CSG ID). As a result, the UE may re-attach to the HeNB or the eNB. As will be appreciated, the MME receives the HO REQUIRED message from HeNB and discovers therefrom that LIPA/SIPTO service continuity is not provided at the target cell (that can be GERAN/UTRAN) and the UE has only LIPA PDN connection(s). As the cause for the IRAT HO was UE's mobility, the UE may re-attach to a 2G/3G network as E-UTRAN may not be available.

Selected embodiments are described with reference to the signal flow diagram in FIG. 12 where the UE 1702 has a LIPA/local SIPTO PDN connection. When the HeNB 1704 triggers the handover to a target cell by sending the handover request to the MME 1708 which includes the information on the target cell, the MME 1708 determines that the active PDN connection are LIPA PDN connections based on the UE context information in the MME. The MME 1708 determines that LIPA PDN continuity cannot be supported towards the target cell based on the UE context information in the MME (including subscription information with LIPA indications, current CSG, current status of LIPA connections, etc.) and the information on the target cell (e.g. technology type, CSG ID). In addition, the MME 1708 rejects the handover request and sends a DETACH REQUEST to the UE 1702 indicating "re-attach required." Upon receiving the DETACH REQUEST indicating "re-attach required," the UE 1702 that is connected to a HeNB 1702 and has at least one active PDN connection that is a LIPA PDN connection determines whether the cell selected to perform the attach is the H(e)B that the UE was connected to when receiving the DETACH REQUEST. If the cell is not a HeNB (i.e., a CSG cell) or the cell belongs to a different CSG, the UE determines, based on configuration information or operator policies or user policies, whether the PDN connections that were active as LIPA PDN connections in the HeNB need to be reactivated in the target cell upon or after the attach.

In the depicted signal flow 1700 shown in FIG. 12, the Source HeNB 1704 sends Handover Required (Direct Forwarding Path Availability, Source to Target transparent container, target eNB Identity, target TAI, S1AP Cause) to the MME 1708 at signal flow 17-1. At signal flow 17-2, MME 1708 becomes aware that the active connections are PDN connections for which continuity is not allowed towards the target cell and sends HO Failure message to eNB 1702. In addition, the MME 1708 initiates the LIPA PDN release procedure by sending DELETE SESSION REQUEST to the S-GW 1710. At signal flow 17-3, the MME 1708 sends a DETACH REQUEST message to the UE 1702 with detach type "re-attach required." At signal flow 17-3, the UE 1702 responds with a DETACH RESPONSE message to the MME 1708. At signal flow 17-4, the UE 1702 send a ATTACH REQUEST message to the MME 1708 after establishing RRC connection to the target eNB 1706 through Random access procedure. The rest of the attach procedure is performed thereafter.

Another selected embodiment addresses the case of connected mode mobility between a HNB and macro GERAN/UTRAN or a different CSG for which LIPA continuity is not provided. In this solution, the SGSN determines during the handover preparation that the UE is moving to a cell for which LIPA continuity cannot be provided, and upon completion of the handover, the SGSN initiates PDP context deactivation procedure for LIPA/SIPTO PDP context(s) possibly providing an explicit cause indicating that the deactivation is due to LIPA continuity not being supported.

In accordance with selected embodiments, another solution addresses the cases of idle mode mobility from a HeNB to a eNB or to a HeNB in a different CSG, and mobility from a HNB to macro coverage or to a HNB in a different CSG. This solution uses the UE's Access Stratum (AS)—also known at the NAS layer as lower layer—to detect if the UE has left a specific CSG coverage, including the UE leaving a cell with a CSG ID, and informs the NAS of such event. In response, the NAS can take a variety of actions described below with reference to managing the release of a LIPA PDN connection. If the UE has at least one PDN connection that is not a LIPA PDN connection and the UE has received an indication from the lower layers that the UE has moved to a target CSG cell and the UE determines that the target CSG cell has a CSG identity that is different from the CSG identity of the previous cell, or an indication from the lower layers that the UE has moved to a cell that is not a CSG cell or does not have a CSG ID, the UE sends a Tracking Area Update request or a PDN Disconnect Request for each LIPA PDN connection if the UE is camping or connected to E-UTRAN, or sends a Routing Area Update request or a PDP context disconnection request for each LIPA PDP context or LIPA PDN connection if the UE is camping or connected to GERAN or UTRAN. In this solution, the UE performs a Tracking Area Update procedure or a Combined Tracking Area Update procedure to synchronize the UE EPS bearer context with the MME EPS bearer context for UE mobility where the source cell is a CSG cell and the target cell is not a CSG cell, when the UE has at least one LIPA PDN connection. By performing a Tracking Area Update procedure or a Combined Tracking Area Update procedure, the UE synchronizes the UE EPS bearer context with the MME EPS bearer context for UE mobility where the source cell is a CSG cell and the target cell is a CSG cell, and where the target cell's CSG-ID is not the source cell's CSG-ID, when the UE has at least one LIPA PDN connection. In this solution, the UE performs a Routing Area Update procedure to synchronize the UE context with the SGSN context in for UE mobility where the source cell is a CSG cell and the target cell is not a CSG cell, when the UE has at least one LIPA PDN connection. As will be appreciated, the solution does not work with pre-Rel. 10 UEs.

In selected embodiments, the UE determines that LIPA continuity is allowed or not allowed in a target cell based on the CSG ID of the source cell and the target cell being a non-CSG cell or not having a CSG ID.

Access Stratum Notification

For example, in an access stratum notification embodiment, an NAS idle UE moves outside the H(e)NB, at which point the AS in the UE makes the NAS in the UE aware of the fact the UE has moved outside the previous H(e)NB. Such AS notification can occur when the UE has moved to macro coverage—either E-UTRAN or GERAN/UTRAN—or to a different CSG or to a cell with a different CSG ID. In response to the AS notification, the UE NAS triggers appropriate NAS signaling, such as a TAU or LIPA/SIPTO PDN disconnection procedure for E-UTRAN, or RAU or PDP context disconnection in UTRAN.

In selected embodiments, the UE in state EMM-REGISTERED initiates the tracking area updating procedure by sending a TRACKING AREA UPDATE REQUEST message to the MME when the UE has at least one LIPA PDN connection and the UE has received an indication from the lower layers that the UE has moved to a target CSG cell and the UE determines that the target CSG cell has a CSG identity that is different from the CSG identity of the previous cell, or an indication from the lower layers that the UE has moved to a cell that is not a CSG cell. If the MME receives a TRACKING AREA UPDATE REQUEST from a UE in a cell that is not a CSG cell, and the MME determines that the UE has only LIPA PDN connections, then the MME rejects the tracking area updating procedure. In selected embodiments, the MME sends a TRACKING AREA UPDATE REJECT and indicate "Implicitly Detached" or "No EPS Bearer Context Activated" if the MME received the TRACKING AREA UPDATE REQUEST from a UE in a cell that is not a CSG cell and the MME determines that the UE has only LIPA PDN connections. In response, the UE deletes the list of equivalent PLMNs and deactivate all the EPS bearer contexts locally, if any, and enters the state EMM-DEREGISTERED.NORMAL-SERVICE. The UE then performs a new attach procedure. As will be appreciated, the conditions described above are equivalent to the conditions in which the UE receives an indication from the lower layers that the UE has performed a handover from a CSG cell to a target cell with a different CSG identity, or to a cell that is not a CSG cell.

In other embodiments, the UE operating in CS/PS mode 1 or CS/PS mode 2, in state EMM-REGISTERED, initiates the combined tracking area updating procedure when the UE has at least one LIPA PDN connection and the UE has received an indication from the lower layers that the UE has moved to a target CSG cell and the UE determines that the target CSG cell has a CSG identity that is different from the CSG identity of the previous cell, or an indication from the lower layers that the UE has moved to a cell that is not a CSG cell.

In another embodiment, in order to request PDN disconnection from a PDN, the UE sends a PDN DISCONNECT REQUEST message to the MME. If the UE has at least one PDN connection that is not a LIPA PDN connection and the UE has received an indication from the lower layers that the UE has moved to a target CSG cell and the UE determines that the target CSG cell has a CSG identity that is different from the CSG identity of the previous cell, or an indication from the lower layers that the UE has moved to a cell that is not a CSG cell, the UE sends a PDN Disconnect Request for each LIPA PDN connection.

The UE NAS issues appropriate signaling if the UE is moving from a HeNB to E-UTRAN/UTRAN/GERAN macro coverage, or from a HNB to UTRAN/GERAN macro coverage, or from a H(e)NB in a CSG to an H(e)B in another CSG, based on the CSG ID of the new cell or based on the new cell being a non-CSG cell or not having a CSG ID. In this embodiment, the NAS signaling can be (1) a TAU procedure, (2) a PDN disconnection procedure if the UE has at least two PDN connections and at least one PDN connection is a LIPA PDN connection, or (3) a detach procedure if the UE has only LIPA PDN connections followed by an attach procedure. With this approach, the UE becomes aware as soon as leaving the H(e)NB that the LIPA connectivity is lost.

In accordance with selected embodiments, another solution addresses the cases of idle mode mobility, and delay in UE discovery of lost connectivity due to idle mode mobility between H(e)NB and macro coverage or other H(e)NB for which continuity shall not be provided. In this solution, when the UE receives SGSN/MME paging and the UE replies to the paging from a cell for which LIPA continuity is not supported, the SGSN/MME releases the LIPA PDN connections. This may result in the UE being detached if the LIPA PDN connection(s) being disconnected by the MME are the only PDN connections active.

In operation, a UE is paged by the SGSN or MME. If the UE replies to the paging from a cell for which LIPA continuity is not supported, the SGSN/MME releases the LIPA PDN connections. The SGSN/MME determines that LIPA continuity is not supported based on the information of the cell the UE is answering the paging from (e.g. RAT type, CSG ID) and the UE context in the SGSN/MME. This may result in the UE being detached if the LIPA PDN connection(s) being disconnected by the MME are the only PDN connections active. In selected embodiments, the SGSN/MME disconnects the LIPA connections only if the downlink data that triggered the paging corresponds to (one of) the LIPA PDN connections. In other embodiments, the SGSN/MME disconnects the LIPA connections independently of what PDN connection the downlink belongs to based on the fact that the UE responds to the paging from a cell for which LIPA PDN connection continuity shall not be supported.

In accordance with selected embodiments, another solution addresses the cases of connected mode mobility from HeNB to GERAN/UTRAN with ISR active, and from HNB to GERAN/UTRAN. The solution uses the Access Stratum (AS) of the UE to detect if the UE has left a specific CSG coverage before the UE performs any NAS signaling, and informs the NAS of such event. In response, the NAS can take a variety of actions described below with reference to managing the release of a LIPA PDN connection. This could include deactivation of ISR in certain scenarios.

In selected embodiments, the UE determines that LIPA continuity is provided or not provided in a target cell based on the CSG ID of the source cell being different from the CSG ID of the target cell, or the target cell being a non-CSG cell or not having a CSG ID, or the UE moving to a different CSG cell with the same CSG ID of the source cell.

UE-Based for HNB to Macro GERAN/UTRAN, ISR-Enabled

In a UE-based embodiment for HNB to macro GERAN/UTRAN, ISR-enabled, the Idle mode Signaling Reduction (ISR) is enabled when LIPA PDN connections are present to address the cases of connected mode mobility from HeNB source cell to a GERAN/UTRAN target cell, and the case of CS Fallback with PS HO. To this end, the solution takes advantage of the fact that the AS and NAS in the UE know that there is an intersystem change (i.e., that the UE has performed a handover between a source cell of a first radio technology to a target cell of a different type of technology).

In operation, the AS in a UE makes the UE NAS aware of the inter-system change. If the UE determines that LIPA continuity is allowed, the UE does not do anything. However, if the UE determines that LIPA continuity is not allowed (or does not know whether LIPA continuity is allowed) and that at least one of the PDN connections active in the HeNB before the handover is a LIPA connection, then the UE triggers appropriate NAS signaling (either a TAU or LIPA/SIPTO PDN disconnection procedure for E-UTRAN, or RAU/PDP context disconnection in UTRAN).

In selected embodiments, the UE in state EMM-REGISTERED initiates the tracking area updating procedure by sending a TRACKING AREA UPDATE REQUEST message to the MME when the UE has at least one LIPA PDN connection and the UE has received an indication from the lower layers that the UE has moved to a target CSG cell and the UE determines that the target CSG cell has a CSG identity that is different from the CSG identity of the previous cell, or an indication from the lower layers that the UE has moved to a cell that is not a CSG cell. However, if the MME receives a TRACKING AREA UPDATE REQUEST from a UE in a cell that is not a CSG cell, and the MME determines that the UE has only LIPA PDN connections, then the MME shall reject the tracking area updating procedure. In selected embodiments, the MME sends a TRACKING AREA UPDATE REJECT and indicate "Implicitly Detached" or "No EPS Bearer Context Activated" if the MME received the TRACKING AREA UPDATE REQUEST from a UE in a cell that is not a CSG cell and the MME determines that the UE has only LIPA PDN connections. In response, the UE shall delete the list of equivalent PLMNs and deactivate all the EPS bearer contexts locally, if any, and shall enter the state EMM-DEREGISTERED.NORMAL-SERVICE.

In other embodiments, the UE operating in CS/PS mode 1 or CS/PS mode 2, in state EMM-REGISTERED, shall initiate the combined tracking area updating procedure when the UE has at least one LIPA PDN connection and the UE has received an indication from the lower layers that the UE has moved to a target CSG cell and the UE determines that the target CSG cell has a CSG identity that is different from the CSG identity of the previous cell, or an indication from the lower layers that the UE has moved to a cell that is not a CSG cell.

The UE may establish one or more PDP contexts corresponding to the one or more APNs corresponding to the one or more LIPA PDN connections based on configuration information or operator policies or user policies.

Figure 13:
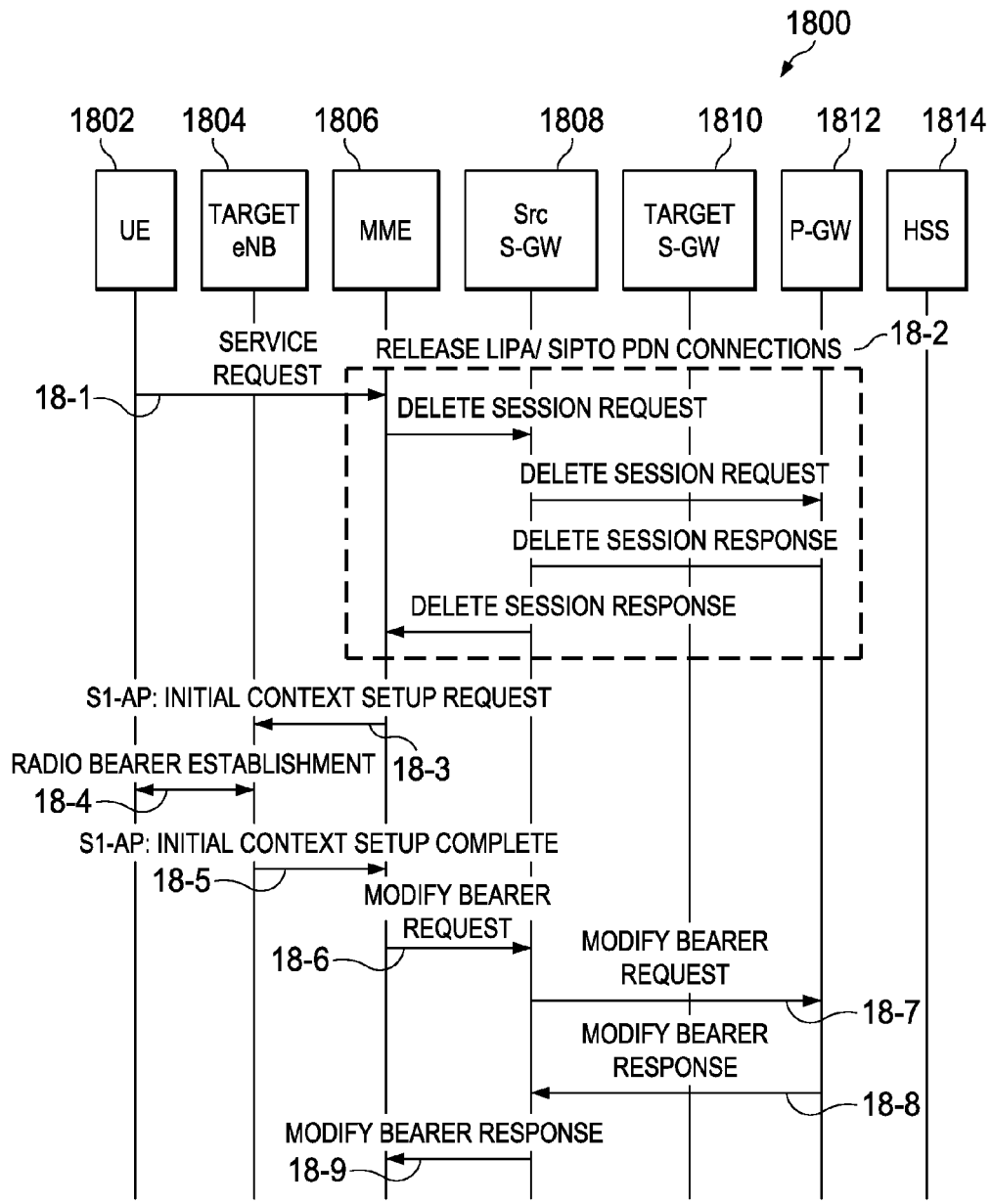
FIG. 13 is a signal flow diagram illustrating a LIPA/SIPTO PDN disconnect procedure implemented as part of a service request procedure where the MME provides bearers for all EPS bears excluding the LIPA/SIPTO bearers.

In accordance with selected embodiments, another solution is described with reference to FIG. 13, and addresses the case of NAS idle mode mobility where the UE enters NAS connected mode after performing idle mobility outside the H(e)NB. In this solution, if a UE 1802 sends a Service Request (SR) to the MME 1806 from a cell for which LIPA/

SIPTO service continuity is not provided for a LIPA PDN connection previously established in a HeNB, the MME 1806 releases LIPA/SIPTO PDN connections before sending an Initial Context Setup Request message to the target eNB 1804.

The applied assumptions in this case are that (1) the UE had a PDN connection that goes through the core network as well as LIPA PDN connection before it enters into IDLE mode, (2) Service Continuity for the LIPA and SIPTO local is not supported, (3) the UE is in ECM-IDLE mode before the UE sends SERVICE REQUEST, and (4) MME relocation is not involved.

In operation, a UE 1802 sends a Service Request (signal flow 18-1) to the MME 1806 from a cell which does not provide LIPA/SIPTO service continuity for a previously established LIPA PDN connection in a HeNB. Upon receiving SR from the UE 1802, MME 1806 discovers that the UE 1802 is connected to a cell to which LIPA/SIPTO service continuity is not provided. Before the MME 1806 sends an Initial Context Setup Request message to the target eNB 1804 (signal flow 18-3), the service request is treated at the MME 1806 (signal flow 18-2) by providing bearers for all the EPS bearers excluding the LIPA bearers if there are PDN connections that are not LIPA PDN connections. The rest of procedure (signal flows 18-4 through 18-9) follows UE-initiated Service Request procedures.

Figure 14:
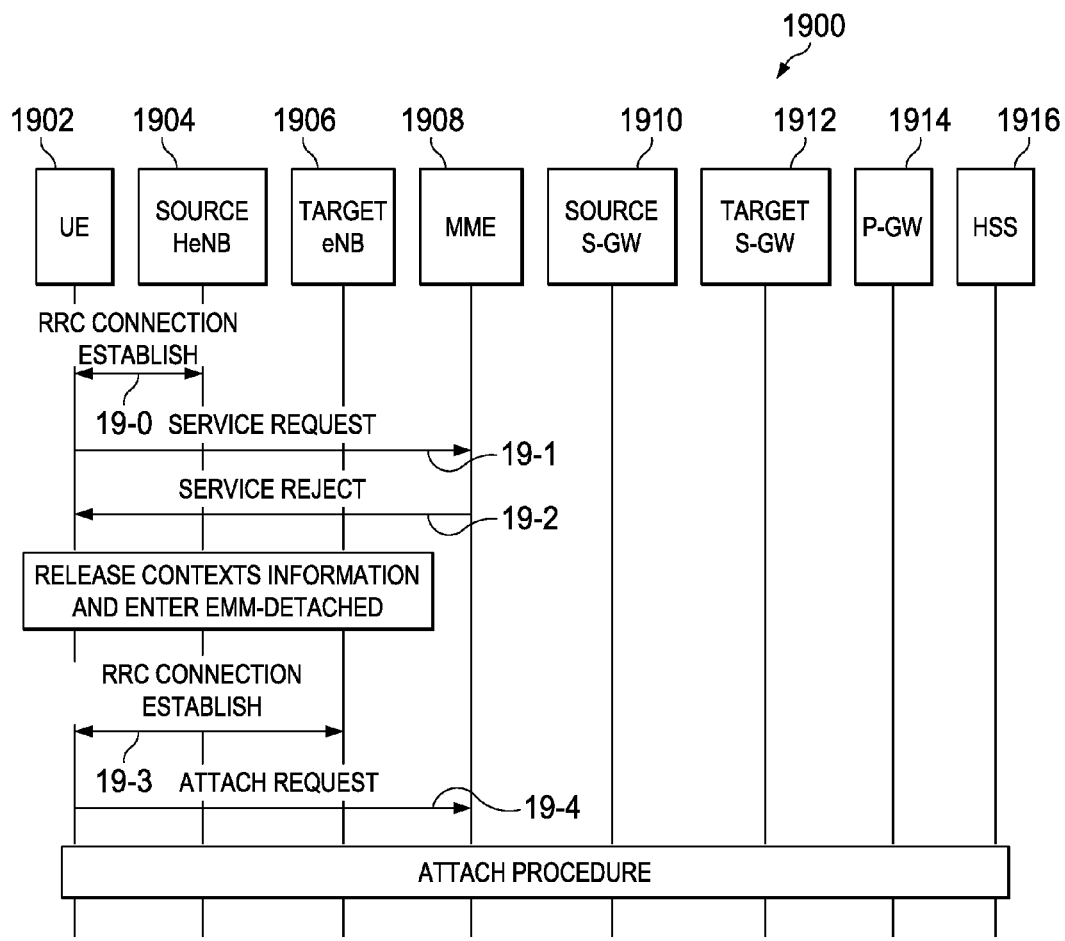
FIG. 14 is a signal flow diagram illustrating a LIPA/SIPTO PDN disconnect procedure where the UE re-attaches to the network after the MME rejects the UE's service request.

In accordance with selected embodiments, another solution is described with reference to FIG. 14, and addresses the case of NAS idle mode mobility where the UE enters NAS connected mode after performing idle mobility outside the HeNB. In this solution, if a UE 1902 sends a Service Request (SR) to the MME 1906 from a cell for which LIPA/SIPTO service continuity is not provided for a LIPA PDN connection previously established in a first or source HeNB 1904, and the UE 1902 has only LIPA PDN connections, then the MME 1908 sends SERVICE REJECT message which specifies an "Implicitly Detached" cause (since releasing LIPA PDN connection results in UE being detached from the network).

The applied assumptions in this case are that (1) the UE had only LIPA PDN connections before it enters into IDLE mode, (2) Service Continuity for the LIPA and SIPTO local is not supported, (3) the UE is in ECM-IDLE mode before the UE sends SERVICE REQUEST, and (4) MME relocation is not involved.

In operation, a UE 1902 sends a Service Request to the MME 1908 (signal flow 19-1) from a cell for which LIPA/SIPTO service continuity is not provided for a LIPA PDN connection previously established in a HeNB. Upon receiving the SR from the UE 1902, MME 1908 discovers that the UE is connected to a cell which is not directly connected to the residential/enterprise network. Based on this, the MME sends SERVICE REJECT message (signal flow 19-2) with a specified cause "Implicitly Detached" (since releasing LIPA PDN connection results in UE being detached from the network). In response, the UE 1902 releases all the bearer contexts and resets its EMM status to EMM-DETACHED and re-attach to the network by sending out ATTACH REQUEST to the MME 1908 (signal flow 19-4). The UE 1902 may or may not attempt to reconnect to the APNs corresponding to the previous LIPA PDN connections by requesting for LIPA connectivity for such APNs.

Alternatively, the MME 1908 can send a new reject cause "implicitly detached—LIPA not allowed." In response, the UE 1902 releases all the bearer contexts, resets its EMM status to EMM-DETACHED, and re-attaches to the network by sending out an ATTACH REQUEST message to the MME 1908 after establishing RRC connection 19-3 to the second or target eNB 1906. The UE 1902 will not try to reconnect to the APNs corresponding to the previous LIPA PDN connections by requesting for LIPA connectivity for such APNs.

Figure 15:
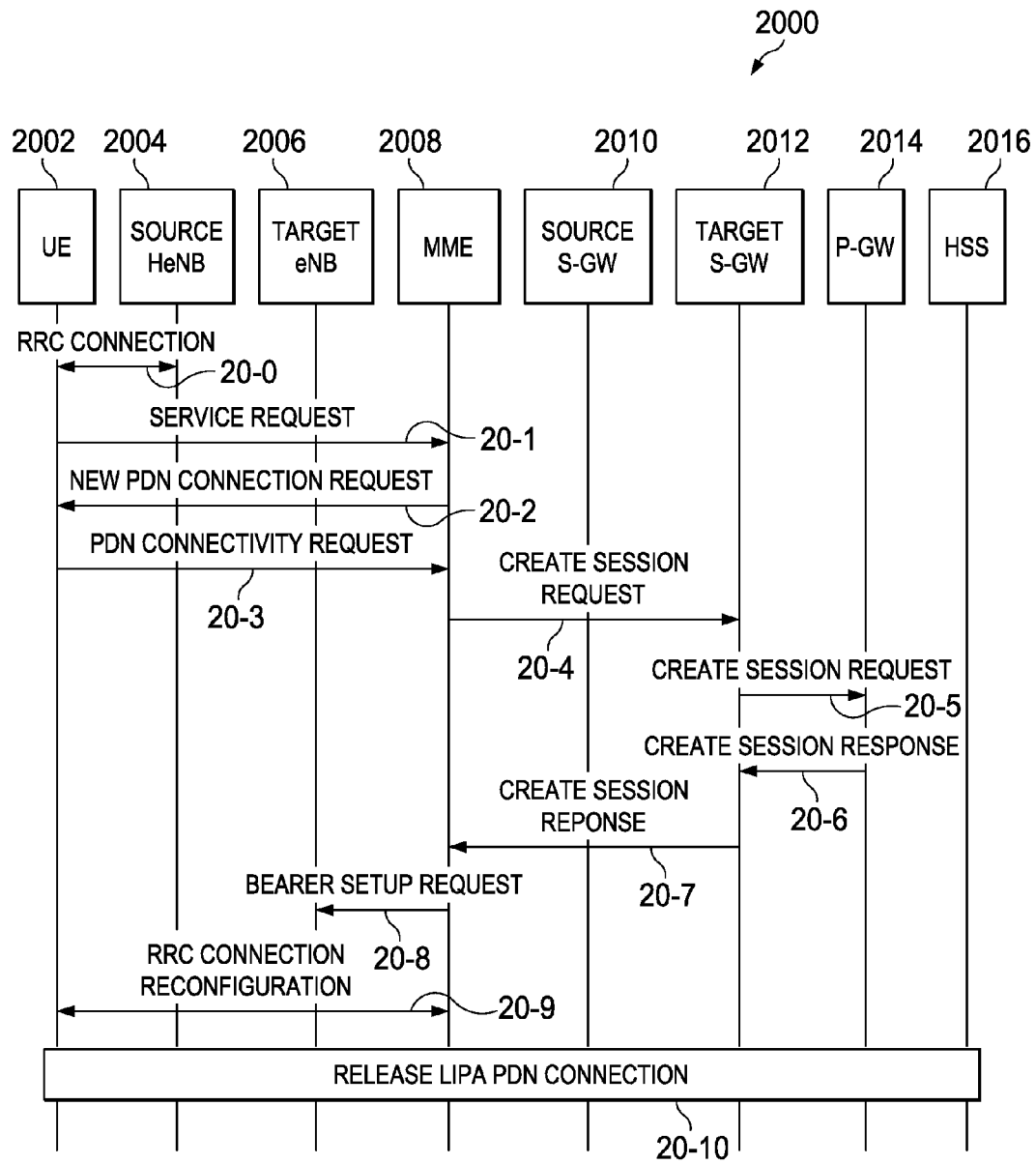
FIG. 15 is a signal flow diagram illustrating a LIPA/SIPTO PDN disconnect procedure where a new PDN connection is triggered in response to the UE's service request.

In accordance with selected embodiments, another solution is described with reference to FIG. 15, and addresses the case of NAS idle mode mobility where the UE enters NAS connected mode after performing idle mobility outside the HeNB. In this solution, a LIPA PDN connection is a PDN Connection that the MME authorizes for connectivity to a PDN GW for a UE connected to a HeNB based on a request from the UE for LIPA connectivity and based on the CSG ID of the HeNB. Alternatively, a LIPA PDN Connection is a PDN Connection which was activated by the UE requesting LIPA connectivity type "LIPA" and the MME informing the UE of the connectivity type provided. Alternatively, a LIPA PDN Connection is a PDN Connection or PDP Context that gives access to the UE to services located in the local residential/corporate IP network.

In this solution, if a UE 2002 sends a Service Request to the MME 2008 from a cell for which LIPA/SIPTO service continuity is not provided for a LIPA PDN connection previously established in a HeNB, and the UE 2002 has only LIPA PDN connections, then the MME 2008 orders the UE 2002 to initiate another PDN connection by sending a NEW PDN CONNECTION REQUEST message. This is based on the idea of introducing a new NAS message. Thus, if the network/MME receives a SERVICE REQUEST from a UE in a cell that is not a CSG cell or a CSG cell with a CSG identity different from the CSG identity of the cell where the UE activated the LIPA PDN connection, then the network/MME returns a SERVICE REJECT message. Alternatively, if the network receives a SERVICE REQUEST from a UE in a cell that is not a CSG cell or a CSG cell with a CSG identity different from the CSG identity of the cell where the MME received the ACTIVATE PDP CONTEXT REQUEST from the UE for the LIPA PDP contexts, then the network returns a SERVICE REJECT message.

The applied assumptions in this case are that (1) the UE had only LIPA PDN connections before it enters into IDLE mode, (2) Service Continuity for the LIPA and SIPTO local is not supported, (3) UE is in ECM-IDLE mode before the UE sends SERVICE REQUEST, and (4) MME relocation is not involved.

In operation, a UE 2002 sends a Service Request to the MME 2008 (signal flow 20-1), either on arrival of UL packet or as a response to a paging message. At signal flow 20-2, the MME 2008 sends either a NEW PDN CONNECTION REQUEST message to the UE 2002 (this message implies that the existing PDN connection, which is LIPA PDN connection, is not available to use), or a SERVICE REJECT message with a new cause "New PDN connection is required." (It will be noted that the NEW PDN CONNECTION REQUEST message has not been defined, so this solution does not work with pre-Rel. 10 UEs.) At signal flow 20-3, the UE 2002 responds to the message by locally releasing the existing LIPA PDN connections and initiating a PDN connection establishment procedure by sending a PDN Connectivity Request to MME (signal flow 20-3). If all the active PDP contexts are LIPA PDP contexts, then the UE may use an APN in the attach procedure that is different from the APNs corresponding to the active LIPA PDP contexts. For the new PDN connection, APN will be selected based on the UE's local policy.

When sending the NEW PDN CONNECTION REQUEST message, the MME 2008 can use a notification procedure to inform the UE 2002 about events which are relevant for the upper layer which is using an EPS bearer context or has requested a procedure transaction. If the UE 2002 indicates that it supports the notification procedure, the network may initiate the procedure at any time while a PDN connection exists or a procedure transaction is ongoing. For example, MME 2008 can initiate the notification procedure by sending a NOTIFICATION message to the UE 2002. When the UE 2002 receives the NOTIFICATION message, the ESM protocol entity in the UE 2002 provides the notification indicator to the upper layer having one of two values. The first value can be used to signify that a handover is cancelled and that session re-establishment be performed. The second value can be used to signify that no active PDN connection is available and that a PDN connection needs to be re-established.

In selected embodiments, the MME sends a SERVICE REJECT message and indicates that a new PDN connection is needed if the MME received a SERVICE REQUEST from a UE in cell that is not a CSG cell and the UE has at east one LIPA PDN connection. In other embodiments, the MME sends a SERVICE REJECT message and indicates that a new PDN connection is needed if the MME received a SERVICE REQUEST from a UE in a CSG cell with a CSG identity different from the CSG identity of the cell where the UE activated the PDN connection or PDN connections. In response, the UE performs a UE-requested PDN connectivity procedure. In the case of a UE that has only LIPA PDN connections and receives a message from the MME that a new PDN connection is needed, the UE may use an APN in the UE requested PDN connectivity procedure that is different from the APNs corresponding to the LIPA PDN connections.

In other embodiments, the MME sends a SERVICE REJECT message and indicates that "No PDP Context Activated" if the MME/network receives a SERVICE REQUEST from a UE in a cell that is not a CSG cell and the MME determines that the UE has at least one LIPA PDP context, or if the MME/network receives a SERVICE REQUEST from a UE in a CSG cell with a CSG identity different from the CSG identity of the cell where the UE activated the LIPA PDP context or PDP contexts. In response, the UE deactivates locally all active PDP and MBMS contexts, and enters the state GMM-REGISTERED.NORMAL-SERVICE. The UE may also activate PDP context(s) to replace any previously active PDP contexts, and may also perform the procedures needed in order to activate any previously active multicast service(s). If the UE has only LIPA PDP contexts when the MME/network indicates that "No PDP Context Activated" and if the UE activates PDP context(s) to replace any previously active PDP contexts, the UE should not request a LIPA PDP context in the ACTIVATE PDP CONTEXT REQUEST. If a specific APN is used for LIPA, the UE should use an APN in the ACTIVATE PDP CONTEXT REQUEST message that is different from the APNs corresponding to the LIPA PDP contexts.

In other embodiments, the MME sends a SERVICE REJECT message and indicates Implicitly Detached if the network received a SERVICE REQUEST from a UE in a CSG cell with a CSG identity different from the CSG identity of the cell where the UE activated the LIPA PDP context or PDP contexts, or if the MME received the SERVICE REQUEST from a UE in a CSG cell with a CSG identity different from the CSG identity of the cell where the UE activated the LIPA PDN connection or LIPA PDN connections, or if the UE sends a SERVICE REQUEST from a cell that is not a CSG cell and the UE has at east one LIPA PDN connection. In response, the UE deletes the list of equivalent PLMNs and enters the state EMM-DEREGISTERED.NORMAL-SERVICE. The UE deletes any mapped EPS security context or partial native EPS security context, and then performs a new attach procedure. If the UE has only LIPA PDN connections when the UE receives an "Implicitly Detached" message, the UE may use an APN in the attach procedure that is different from the APNs corresponding to the LIPA PDN connections. If A/Gb mode or Iu mode is supported by the UE, the UE also handles the GMM state for the case when the combined routing area updating procedure is rejected with the GMM cause with the same value. As will be appreciated, a UE in CS/PS mode 1 or CS/PS mode 2 of operation is still IMSI attached for non-EPS services.

If connectivity with the requested PDN is accepted, the MME 2008 stores the CSG identity of the cell where the MME 2008 received the PDN CONNECTIVITY REQUEST message from the UE 2002. Similarly, if the MME 2008 accepts the requested PDP context in a CSG cell, the MME 2008 stores the CSG identity of the cell where the UE activated the PDP context. At signal flows 20-4 through 20-0, PDN connection establishment procedure is performed as indicated. On completion of PDN connection establishment procedure, MME 2008 initiates LIPA PDN connection release procedure (signal flow 20-10).

In accordance with selected embodiments, another solution is described which addresses the cases of NAS idle mode mobility where the UE moves from a HeNB to GERAN/UTRAN. In this solution, a UE sends a TAU request to the MME from a cell for which LIPA/SIPTO service continuity is not provided for a LIPA PDN connection previously established in a HeNB. Upon receiving the TAU request message from the UE, the MME either performs the TAU procedure without releasing the LIPA PDN connections in case the UE goes back to the HeNB, or it releases them (which may include rejecting the TAU and order the UE to disconnect and re-attach). In selected embodiments, if the MME determines that the UE has at least one PDN connection that is not a LIPA PDN connection and at least one LIPA PDN connection, and the MME has received a TRACKING AREA UPDATE REQUEST message from the UE in a cell that is not a CSG cell or a CSG cell with a different CSG identity than the previous CSG cell or in a cell that is not a CSG cell, and if the MME determines that the UE is RRC connected but only signaling bearers are created during the tracking are update procedure, the MME accepts the tracking area update request.

The applied assumptions in this case are that (1) Service Continuity for the LIPA is not supported, (2) UE had at least one LIPA connection before it enters into IDLE mode, (3) UE is in ECM-IDLE mode before the UE initiates TAU, (4) UE is connected to a cell where LIPA/SIPTO service continuity is not provided when the UE initiates TAU procedure, AND (5) TAU is initiated either because TAU timer expires or because the UE enters into a new TA while the UE is in IDLE mode.

TAU Update Without PDN Release

In selected embodiments for providing a TAU update without PDN release, the UE is in RRC connected mode and ECM idle mode when sending the TAU. In this case, only radio signaling bearers are created, and the MME performs TAU update without releasing any PDN connection since the UE is in IDLE mode since the UE may go back to the HeNB's coverage before it changes into CONNECTED mode. In this embodiment, disconnection of the PDN is delayed. The MME decision may depends on several factors such as time duration that UE has been in IDLE mode, if the UE stays in the same TA that the HeNB belongs, etc.

MME Releases PDN Connections

In selected embodiments where the MME releases PDN connections, the MME releases LIPA/SIPTO PDN connection(s) as the UE is currently connected to a cell where LIPA/SIPTO service continuity is not provided. In this case, if the MME decision to release LIPA/SIPTO PDN connections results in no remaining PDN connection for the UE, the MME will reject the TAU Request with cause "No EPS bearer context activated." If so, the UE will release its context information and re-attach to the network, which involves new PDN connection establishment.

PDN Address

The purpose of the PDN address information element is to assign an IPv4 address to the UE associated with a packet data network and to provide the UE with an interface identifier to be used to build the IPv6 link local address. The PDN address information element is coded as shown in Tables 1 and 2 below.

TABLE 1

| PDN address information element | | | | | | | | |
|---|---|---|---|---|---|---|---|---|
| 8 | 7 | 6 | 5 | 4 | 3 | 2 | 1 | |
| | | | PDN address IEI | | | | | octet 1 |
| | | | Length of PDN address contents | | | | | octet 2 |
| 0 | 0 | 0 | Service Continuity Flag | | PDN type value | | | octet 3 |
| | | | PDN address information | | | | | octet 4 |
| | | | | | | | | octet 15 |

As shown above in Table 1, the PDN address is a type 4 information element with minimum length of 7 octets and a maximum length of 15 octets.

TABLE 2

| PDN address information element |
|---|
| PDN type value (octet 3) |
| Bits |
| 3   2   1 |
| 0   0   1   IPv4 |
| 0   1   0   IPv6 |
| 0   1   1   IPv4v6 |
| All other values are reserved. |
| Bit 4 to 8 of octet 3 are spare and shall be coded as zero. |
| PDN address information (octet 4 to 15) |
| If PDN type value indicates IPv4, the PDN |
| address information in octet 4 to octet 7 contains an IPv4 address. |
| Bit 8 of octet 4 represents the most significant bit of the IPv4 address |
| and bit 1 of octet 7 the least significant bit. |
| If PDN type value indicates IPv6, the PDN address |
| information in octet 4 to octet 11 contains an IPv6 |
| interface identifier. Bit 8 of octet 4 represents the most significant bit |
| of the IPv6 interface identifier and bit 1 of octet 11 the |
| least significant bit. |
| If PDN type value indicates IPv4v6, the PDN address information in octet |
| 4 to octet 15 contains an IPv6 interface identifier and an IPv4 address. |
| Bit 8 of octet 4 represents the most significant bit of the IPv6 interface |
| identifier and bit 1 of octet 11 the least significant bit. Bit 8 of octet |
| 12 represents the most significant bit of the IPv4 address and |
| bit 1 of octet 15 the least significant bit. |
| If PDN type value indicates IPv4 or IPv4v6 and DHCPv4 is to be used to |
| allocate the IPv4 address, the IPv4 address shall be coded as 0.0.0.0. |

Figure 16:
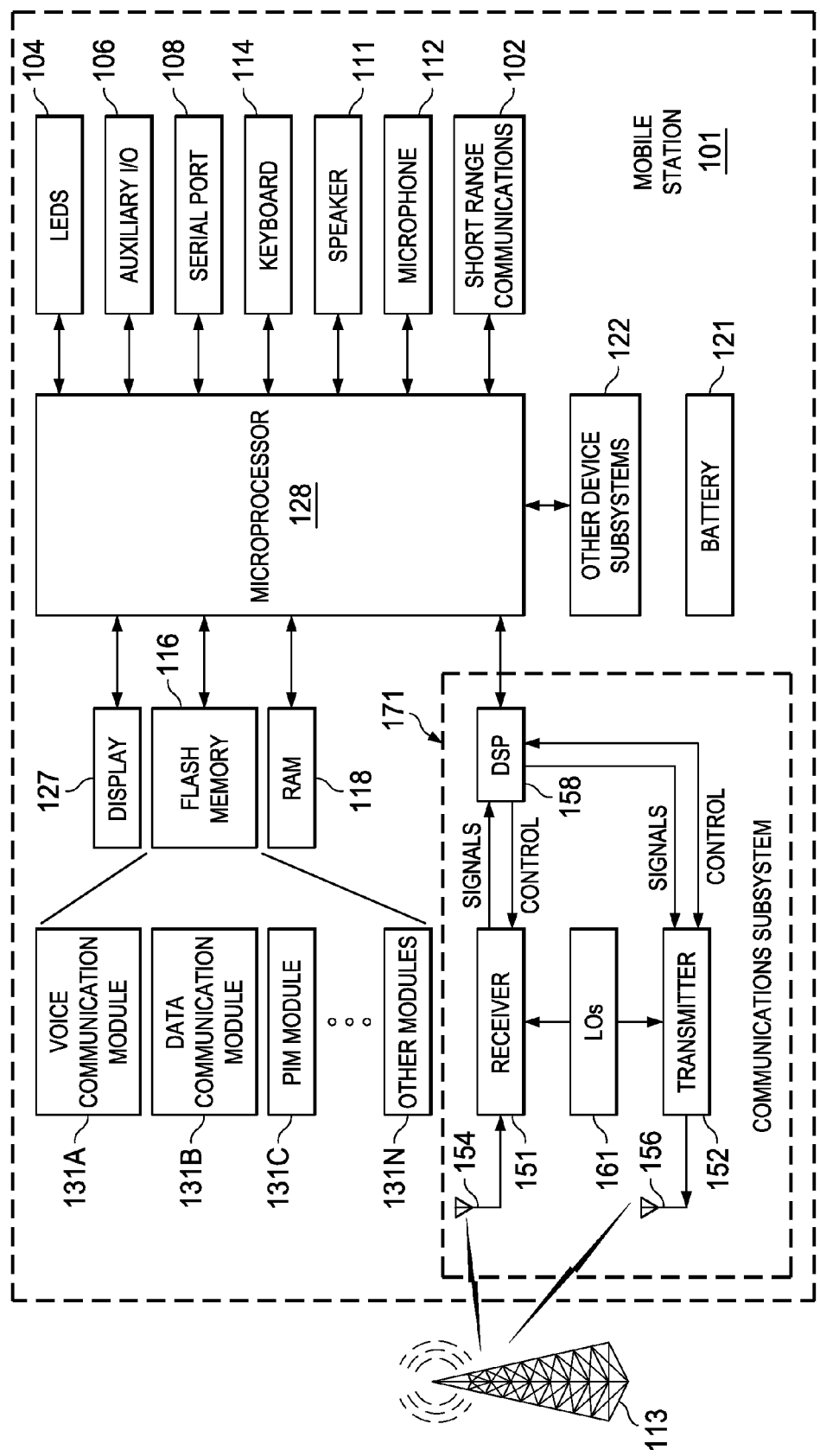
FIG. 16 is a schematic block diagram illustrating exemplary components of a mobile wireless communications device which may be used with selected embodiments of the present disclosure.

Referring now to FIG. 16, there is shown a schematic block diagram illustrating exemplary components of a mobile wireless communications device 101 which may be used with selected embodiments of the present disclosure. The wireless device 101 is shown with specific components for implementing features described above. It is to be understood that the wireless device 101 is shown with very specific details for exemplary purposes only.

A processing device (e.g., microprocessor 128) is shown schematically as coupled between a keyboard 114 and a display 127. The microprocessor 128 controls operation of the display 127, as well as overall operation of the wireless device 101, in response to actuation of keys on the keyboard 114 by a user.

The wireless device 101 has a housing that may be elongated vertically, or may take on other sizes and shapes (including clamshell housing structures). The keyboard 114 may include a mode selection key, or other hardware or software for switching between text entry and telephony entry.

In addition to the microprocessor 128, other parts of the wireless device 101 are shown schematically. These include a communications subsystem 171; a short-range communications subsystem 102; the keyboard 114 and the display 127, along with other input/output devices including a set of LEDs 104, a set of auxiliary I/O devices 106, a serial port 108, a speaker 111 and a microphone 112; as well as memory devices including a flash memory 116 and a Random Access Memory (RAM) 118; and various other device subsystems 122. The wireless device 101 may have a battery 121 to power the active elements of the wireless device 101. The wireless device 101 is in some embodiments a two-way radio frequency (RF) communication device having voice and data communication capabilities. In addition, the wireless device 101 in some embodiments has the capability to communicate with other computer systems via the Internet.

Operating system software executed by the microprocessor 128 is in some embodiments stored in a persistent store, such as the flash memory 116, but may be stored in other types of memory devices, such as a read only memory (ROM) or similar storage element. In addition, system software, specific device applications, or parts thereof, may be temporarily loaded into a volatile store, such as the RAM 118. Communication signals received by the wireless device 101 may also be stored to the RAM 118.

The microprocessor 128, in addition to its operating system functions, enables execution of software applications on the wireless device 101. A predetermined set of software applications that control basic device operations, such as a voice communications module 131A and a data communications module 131B, may be installed on the wireless device 101 during manufacture. In addition, a personal information manager (PIM) application module 131C may also be installed on the wireless device 101 during manufacture. The PIM application is in some embodiments capable of organizing and managing data items, such as e-mail, calendar events, voice mails, appointments, and task items. The PIM application is also in some embodiments capable of sending and receiving data items via a wireless network 113. In some embodiments, the data items managed by the PIM application are seamlessly integrated, synchronized and updated via the wireless network 113 with the device user's corresponding data items stored or associated with a host computer system. As well, additional software modules, illustrated as another software module 131N, may be installed during manufacture.

Communication functions, including data and voice communications, are performed through the communication subsystem 171, and possibly through the short-range communications subsystem 102. The communication subsystem 171 includes a receiver 151, a transmitter 152 and one or more antennas, illustrated as a receive antenna 154 and a transmit antenna 156. In addition, the communication subsystem 171 includes a processing module, such as a digital signal processor (DSP) 158, and local oscillators (LOs) 161. In some embodiments, the communication subsystem 171 includes a separate antenna arrangement (similar to the antennas 154 and 156) and RF processing chip/block (similar to the Receiver 151, LOs 161 and Transmitter 152) for each RAT, although a common baseband signal processor (similar to DSP 158) may be used for baseband processing for multiple RATs. The specific design and implementation of the communication subsystem 171 is dependent upon the communication network in which the wireless device 101 is intended to operate. For example, the communication subsystem 171 of the wireless device 101 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), etc. Examples of CDMA include 1X and 1x EV-DO. The communication subsystem 171 may also be designed to operate with an 802.11 Wi-Fi network or an 802.16 WiMAX network or both. Other types of data and voice networks, both separate and integrated, may also be utilized with the wireless device 101.

Network access may vary depending upon the type of communication system. For example, in the Mobitex™ and DataTAC™ networks, wireless devices are registered on the network using a unique Personal Identification Number (PIN) associated with each device. In GPRS networks, however, network access is typically associated with a subscriber or user of a device. A GPRS device therefore typically has a subscriber identity module, commonly referred to as a Subscriber Identity Module (SIM) card, in order to operate on a GPRS network.

When network registration or activation procedures have been completed, the wireless device 101 may send and receive communication signals over the communication network 113. Signals received from the communication network 113 by the receive antenna 154 are routed to the receiver 151, which provides for signal amplification, frequency down conversion, filtering, channel selection, etc., and may also provide analog to digital conversion. Analog-to-digital conversion of the received signal allows the DSP 158 to perform more complex communication functions, such as demodulation and decoding. In a similar manner, signals to be transmitted to the network 113 are processed (e.g., modulated and encoded) by the DSP 158 and are then provided to the transmitter 152 for digital to analog conversion, frequency up conversion, filtering, amplification and transmission to the communication network 113 (or networks) via the transmit antenna 156.

In addition to processing communication signals, the DSP 158 provides for control of the receiver 151 and the transmitter 152. For example, gains applied to communication signals in the receiver 151 and the transmitter 152 may be adaptively controlled through automatic gain control algorithms implemented in the DSP 158.

In a data communication mode, a received signal, such as a text message or web page download, is processed by the communication subsystem 171 and is input to the microprocessor 128. The received signal is then further processed by the microprocessor 128 for an output to the display 127, or alternatively to some other auxiliary I/O devices 106. A device user may also compose data items, such as e-mail messages, using the keyboard 114 and/or some other auxiliary I/O device 106, such as a touchpad, a rocker switch, a thumb-wheel, or some other type of input device. The composed data items may then be transmitted over the communication network 113 via the communication subsystem 171.

In a voice communication mode, overall operation of the device is substantially similar to the data communication mode, except that received signals are output to a speaker 111, and signals for transmission are generated by a microphone 112. Alternative voice or audio I/O subsystems, such as a voice message recording subsystem, may also be implemented on the wireless device 101. In addition, the display 127 may also be utilized in voice communication mode, for example, to display the identity of a calling party, the duration of a voice call, or other voice call related information.

The short-range communications subsystem 102 enables communication between the wireless device 101 and other proximate systems or devices, which need not necessarily be similar devices. For example, the short range communications subsystem may include an infrared device and associated circuits and components, or a Bluetooth™ communication module to provide for communication with similarly-enabled systems and devices.

It should be understood that as used herein, terms such as coupled, connected, electrically connected, in signal communication, and the like may include direct connections between components, indirect connections between components, or both, as would be apparent in the overall context of a particular embodiment. The term coupled is intended to include, but not be limited to, a direct electrical connection.

Although the described exemplary embodiments disclosed herein are described with reference to selected communication systems, the present disclosure is not necessarily limited to the example embodiments which illustrate inventive aspects of the present disclosure that are applicable to a wide variety of network connectivity arrangements. Thus, the particular embodiments disclosed above are illustrative only and should not be taken as limitations upon the present disclosure, as the disclosure may be modified and practiced in different but equivalent manners apparent to those skilled in the art having the benefit of the teachings herein. Accordingly, the foregoing description is not intended to limit the disclosure to the particular form set forth, but on the contrary, is intended to cover such alternatives, modifications and equivalents as may be included within the spirit and scope of the disclosure as defined by the appended claims so that those skilled in the art should understand that they can make various changes, substitutions and alterations without departing from the spirit and scope of the disclosure in its broadest form.

- Change for one embodiment for 3GPP TS 24.301

=======================Begin of Change=====================================

---
* * * Next change * * *
---

UE behaviour in state EMM-REGISTERED

5.2.3.1 General

The state EMM-REGISTERED is entered at the UE, when:

- the attach or combined attach procedure is performed by the UE (see subclause 5.5.1).

In state EMM-REGISTERED, the UE shall behave according to the substate as explained in subclause 5.2.3.2.

{

The UE shall start the timer LIPA_Connectivity if it receives indication from the lower layers that the UE has performed an handover from a CSG cell to:

- a target cell with a different CSG identity, or
- to a cell that is not a CSG cell.

---
* * * Next change * * *
---

5.5.3 Tracking area updating procedure (S1 mode only)

5.5.3.1 General

The tracking area updating procedure is always initiated by the UE and is used for the following purposes:

- normal tracking area updating to update the registration of the actual tracking area of a UE in the network;

- combined tracking area updating to update the registration of the actual tracking area for a UE in CS/PS mode 1 or CS/PS mode 2 of operation;

- periodic tracking area updating to periodically notify the availability of the UE to the network;

- IMSI attach for non-EPS services when the UE is attached for EPS services. This procedure is used by a UE in CS/PS mode 1 or CS/PS mode 2 of operation;

- in various cases of inter-system change from Iu mode to S1 mode or from A/Gb mode to S1 mode (for details see subclauses 5.5.3.2.2 and subclause 5.5.3.3.2);

- S101 mode to S1 mode inter-system change;

- MME load balancing;

- to update certain UE specific parameters in the network (for details see subclauses 5.5.3.2.2 and subclause 5.5.3.3.2);

- recovery from certain error cases (for details see subclauses 5.5.3.2.2 and subclause 5.5.3.3.2);

- to indicate that the UE enters S1 mode after CS fallback or 1xCS fallback;

- to indicate to the network that the UE has selected a CSG cell whose CSG identity is not included in the UE's Allowed CSG list or in the UE's Operator CSG list; and

- to indicate to the network that the UE's availability for terminating voice calls in the IMS has changed to "available"

- to synchronize the UE EPS bearer context with the MME EPS bearer context for UE mobility where the source cell is a CSG cell and the target cell is not a CSG cell, when the UE has at least one LIPA PDN connection.

- to synchronize the UE EPS bearer context with the MME EPS bearer context for UE mobility where the source cell is a CSG cell and the target cell is a CSG cell, and where the target cell's CSG-ID is not the source cell's CSG-ID, when the UE has at least one LIPA PDN connection.

---

* * * Next change * * *

---

5.5.3.2 Normal and periodic tracking area updating procedure

5.5.3.2.1 General

The periodic tracking area updating procedure is controlled in the UE by timer T3412. When timer T3412 expires, the periodic tracking area updating procedure is started. Start and reset of timer T3412 is described in subclause 5.3.5.

5.5.3.2.2 Normal and periodic tracking area updating procedure initiation

The UE in state EMM-REGISTERED shall initiate the tracking area updating procedure by sending a TRACKING AREA UPDATE REQUEST message to the MME, a) when the UE detects entering a tracking area that is not in the list of tracking areas that the UE previously registered in the MME;

b) when the periodic tracking area updating timer T3412 expires;

c) when the UE enters EMM-REGISTERED.NORMAL-SERVICE and the UE's TIN indicates "P-TMSI";

d) when the UE performs an inter-system change from S101 mode to S1 mode and has no user data pending;

e) when the UE receives an indication from the lower layers that the RRC connection was released with cause "load balancing TAU required";

f) when the UE deactivated EPS bearer context(s) locally while in EMM-REGISTERED.NO-CELL-AVAILABLE, and then returns to EMM-REGISTERED.NORMAL-SERVICE;

g) when the UE changes the UE network capability information or the MS network capability information or both;

h) when the UE changes the UE specific DRX parameter;

i) when the UE receives an indication of "RRC Connection failure" from the lower layers and has no signalling or user uplink data pending (i.e when the lower layer requests NAS signalling connection recovery);

j) when the UE enters S1 mode after 1xCS fallback;

k) when due to manual CSG selection the UE has selected a CSG cell whose CSG identity is not included in the UE's Allowed CSG list or in the UE's Operator CSG list;

l) when the UE reselects an E-UTRAN cell while it was in GPRS READY state or PMM-CONNECTED mode;

m) when the UE supports SRVCC to GERAN or UTRAN and changes the mobile station classmark 2 or the supported codecs, or the UE supports SRVCC to GERAN and changes the mobile station classmark 3;

n) when the UE changes the radio capability for GERAN or cdma2000® or both;

o) when the UE's usage setting or the voice domain preference for E-UTRAN change in the UE; or p) when the UE's availability for terminating voice calls in the IMS changes from "not available" to "available" and the TIN indicates "RAT-related TMSI" and the voice domain preference as defined in 3GPP TS 24.167 [13B] is not "CS voice only" and the UE is configured with "Mobility Management for IMS Voice Termination" enabled as defined in 3GPP TS 24.167 [13B].

q) when the UE has at least one LIPA PDN connection and the UE has received an indication from the lower layers that the UE has moved to a target CSG cell and the UE determines that the target CSG cell has a CSG identity that is different from the CSG identity of the previous cell, or an indication from the lower layers that the UE has moved to a cell that is not a CSG cell.

q) when the timer LIPA_CONNECTIVITY timer expires and the UE has received an indication from the lower layers that the UE has moved to a target CSG cell and the UE determines that the target CSG cell has a CSG identity that is different from the CSG identity stored when the UE entered the EMM-IDLE mode, or to a cell that is not a CSG cell.

q) when the timer LIPA_CONNECTIVITY timer is running and the UE has received an indication from the lower layers that the UE has moved to a target CSG cell and the UE determines that the target CSG cell has a CSG identity that is different from the CSG identity of the previous cell, or an indication from the lower layers that the UE has moved to a cell that is not a CSG cell, and the UE has uplink user data to send over a LIPA PDN connection.

Note: the conditions described above are equivalent to the conditions in which the UE receives an indication from the lower layers that the UE has performed an handover from a CSG cell to a target cell with a different CSG identity, or to a cell that is not a CSG cell.

NOTE 1: Whether the "Mobility Management for IMS Voice Termination" setting is stored in the IMS management object as defined in 3GPP TS 24.167 [13B] or in the UE is an implementation option. If this setting is missing, then "Mobility Management for IMS Voice Termination" is disabled.

* * * Next change * * *

5.5.3.2.5 Normal and periodic tracking area updating procedure not accepted by the network If the tracking area updating cannot be accepted by the network, the MME sends a TRACKING AREA UPDATE REJECT message to the UE including an appropriate EMM cause value.

If the MME receives a TRACKING AREA UPDATE REQUEST from a UE in a cell that is not a CSG cell, and the MME determines that the UE has only LIPA PDN connections, then the MME shall reject the tracking area updating procedure.

Upon receiving the TRACKING AREA UPDATE REJECT message, the UE shall stop timer T3430, stop any transmission of user data, and take the following actions depending on the EMM cause value received.

3 (Illegal UE); or

6 (Illegal ME);

> The UE shall set the EPS update status to EU3 ROAMING NOT ALLOWED (and shall store it according to subclause 5.1.3.3) and shall delete any GUTI, last visited registered TAI, TAI list and eKSI. The UE shall consider the USIM as invalid for EPS services until switching off or the UICC containing the USIM is removed. The UE shall delete the list of equivalent PLMNs and shall enter the state EMM-DEREGISTERED.
>
> If A/Gb mode or Iu mode is supported by the UE, the UE shall handle the GMM parameters GMM state, GPRS update status, P-TMSI, P-TMSI signature, RAI and GPRS ciphering key sequence number and the MM parameters update status, TMSI, LAI and ciphering key sequence number as specified in 3GPP TS 24.008 [13] for the case when the normal routing area updating procedure is rejected with the GMM cause with the same value. The USIM shall be considered as invalid also for non-EPS services until switching off or the UICC containing the USIM is removed.
>
> NOTE: The possibility to configure a UE so that the radio transceiver for a specific radio access technology is not active, although it is implemented in the UE, is out of scope of the present specification.

7 (EPS services not allowed);

> The UE shall set the EPS update status to EU3 ROAMING NOT ALLOWED (and shall store it according to subclause 5.1.3.3) and shall delete any GUTI, last visited registered TAI, TAI list and eKSI. The UE shall consider the USIM as invalid for EPS services until switching off or the UICC containing the USIM is removed. The UE shall delete the list of equivalent PLMNs and shall enter the state EMM-DEREGISTERED.
>
> If A/Gb mode or Iu mode is supported by the UE, the UE shall handle the GMM parameters GMM state, GPRS update status, P-TMSI, P-TMSI signature, RAI and GPRS ciphering key sequence number as specified in 3GPP TS 24.008 [13] for the case when the normal routing area updating procedure is rejected with the GMM cause with the same value.

9 (UE identity cannot be derived by the network);

> The UE shall set the EPS update status to EU2 NOT UPDATED (and shall store it according to subclause 5.1.3.3) and shall delete any GUTI, last visited registered TAI, TAI list and eKSI. The UE shall delete the list of equivalent PLMNs and shall enter the state EMM-DEREGISTERED.
>
> Subsequently, the UE shall automatically initiate the attach procedure.

If A/Gb mode or Iu mode is supported by the UE, the UE shall handle the GMM parameters GMM state, GPRS update status, P-TMSI, P-TMSI signature, RAI and GPRS ciphering key sequence number as specified in 3GPP TS 24.008 [13] for the case when the normal routing area updating procedure is rejected with the GMM cause with the same value.

10(Implicitly detached);

The UE shall delete the list of equivalent PLMNs and shall enter the state EMM-DEREGISTERED.NORMAL-SERVICE. The UE shall delete any mapped EPS security context or partial native EPS security context. The UE shall then perform a new attach procedure. If the UE has only LIPA PDN connections when the MME provides cause #10 in a TRACKING AREA UPDATE REJECT, the UE may use an APN in the attach procedure that is different from the APNs corresponding to the LIPA PDN connections.

If A/Gb mode or Iu mode is supported by the UE, the UE shall handle the GMM state as specified in 3GPP TS 24.008 [13] for the case when the normal routing area updating procedure is rejected with the GMM cause with the same value.

The MME shall sends a TRACKING AREA UPDATE REJECT and indicate Implicitly detached if the MME received the TRACKING AREA UPDATE REQUEST from a UE in a cell that is not a CSG cell and the MME determines that the UE has only LIPA PDN connections.

...

{authors' comment: alternative embodiment}

40(No EPS bearer context activated);

The UE shall delete the list of equivalent PLMNs and deactivate all the EPS bearer contexts locally, if any, and shall enter the state EMM-DEREGISTERED.NORMAL-SERVICE. The UE shall then perform a new attach procedure.

The MME shall sends a TRACKING AREA UPDATE REJECT and indicate No EPS bearer context activated if the MME received the TRACKING AREA UPDATE REQUEST from a UE in a cell that is not a CSG cell and the MME determines that the UE has only LIPA PDN connections.

---

* * * Next change * * *

---

5.5.3.3 Combined tracking area updating procedure

*5.5.3.3.1 General*

Within a combined tracking area updating procedure the messages TRACKING AREA UPDATE ACCEPT and TRACKING AREA UPDATE COMPLETE carry information for the tracking area updating and the location area updating.

The combined tracking area updating procedure follows the normal tracking area updating procedure described in subclause 5.5.3.2.

5.5.3.3.2 Combined tracking area updating procedure initiation

The UE operating in CS/PS mode 1 or CS/PS mode 2, in state EMM-REGISTERED, shall initiate the combined tracking area updating procedure:

a) when the UE that is attached for both EPS and non-EPS services detects entering a tracking area that is not in the list of tracking areas that the UE previously registered in the MME;

b) when the UE that is attached for EPS services wants to perform an attach for non-EPS services. In this case the EPS update type IE shall be set to "combined TA/LA updating with IMSI attach";

c) when the UE performs an intersystem change from A/Gb mode to S1 mode and the EPS services were previously suspended in A/Gb mode;

d) when the UE performs an intersystem change from A/Gb or Iu mode to S1 mode and the UE previously performed a location area update procedure or a combined routing area update procedure in A/Gb or Iu mode, in order to re-establish the SGs association. In this case the EPS update type IE shall be set to "combined TA/LA updating with IMSI attach";

e) when the UE enters EMM-REGISTERED.NORMAL-SERVICE and the UE's TIN indicates "P-TMSI";

f) when the UE receives an indication from the lower layers that the RRC connection was released with cause "load balancing TAU required";

g) when the UE deactivated EPS bearer context(s) locally while in EMM-REGISTERED.NO-CELL-AVAILABLE, and then returns to EMM-REGISTERED.NORMAL-SERVICE;

h) when the UE changes the UE network capability information or the MS network capability information or both;

i) when the UE changes the UE specific DRX parameter;

j) when the UE receives an indication of "RRC Connection failure" from the lower layers and has no signalling or user uplink data pending (i.e when the lower layer requests NAS signalling connection recovery);

k) when due to manual CSG selection the UE has selected a CSG cell whose CSG identity is not included in the UE's Allowed CSG list or in the UE's Operator CSG list;

l) when the UE reselects an E-UTRAN cell while it was in GPRS READY state or PMM-CONNECTED mode;

m) when the UE supports SRVCC to GERAN or UTRAN and changes the mobile station classmark 2 or the supported codecs, or the UE supports SRVCC to GERAN and changes the mobile station classmark 3;

n) when the UE changes the radio capability for GERAN or cdma2000® or both;

o) when the UE's usage setting or the voice domain preference for E-UTRAN change in the UE; or p) when the UE's availability for terminating voice calls in the IMS changes from "not available" to "available" and the TIN indicates "RAT-related TMSI" and the UE is configured with "Mobility Management for IMS Voice Termination" enabled as defined in 3GPP TS 24.167 [13B].

q) when the UE has at least one LIPA PDN connection and the UE has received an indication from the lower layers that the UE has moved to a target CSG cell and the UE determines that the target CSG cell has a CSG identity that is different from the CSG identity of the previous cell, or an indication from the lower layers that the UE has moved to a cell that is not a CSG cell.

q) when the timer LIPA_CONNECTIVITY timer expires and the UE has received an indication from the lower layers that the UE has moved to a target CSG cell and the UE determines that the target CSG cell has a CSG identity that is different from the CSG identity stored when the UE entered the EMM-IDLE mode, or to a cell that is not a CSG cell.

q) when the timer LIPA_CONNECTIVITY timer is running and the UE has received an indication from the lower layers that the UE has moved to a target CSG cell and the UE determines that the target CSG cell has a CSG identity that is different from the CSG identity of the previous cell, or an indication from the lower layers that the UE has moved to a cell that is not a CSG cell, and the UE has uplink user data to send over a LIPA PDN connection.

Note: the conditions described above are equivalent to the conditions in which the UE receives an indication from the lower layers that the UE has performed an handover from a CSG cell to a target cell with a different CSG identity, or to a cell that is not a CSG cell.

NOTE: Whether the "Mobility Management for IMS Voice Termination" setting is stored in the IMS management object as defined in 3GPP TS 24.167 [13B] or in the UE is an implementation option. If this setting is missing, then "Mobility Management for IMS Voice Termination" is disabled.

> * Next change *

5.5.3.3.5 Combined tracking area updating procedure not accepted by the network If the combined tracking area updating cannot be accepted by the network, the MME shall send a TRACKING AREA UPDATE REJECT message to the UE including an appropriate EMM cause value.

If the MME receives a TRACKING AREA UPDATE REQUEST from a UE in a cell that is not a CSG cell, and the MME determines that the UE has only LIPA PDN connections, then the MME shall reject the tracking area updating procedure.

Upon receiving the TRACKING AREA UPDATE REJECT message, the UE shall stop timer T3430, stop any transmission of user data, enter state MM IDLE, and take the following actions depending on the EMM cause value received.

3 (Illegal UE);

6 (Illegal ME); or

8 (EPS services and non-EPS services not allowed);

> The UE shall set the EPS update status to EU3 ROAMING NOT ALLOWED (and shall store it according to subclause 5.1.3.3) and shall delete any GUTI, last visited registered TAI, TAI Listand eKSI.

> The UE shall consider the USIM as invalid for EPS and non-EPS services until switching off or the UICC containing the USIM is removed. Additionally, the UE shall delete the list of equivalent PLMNs and shall enter the state EMM-DEREGISTERED.

> If A/Gb mode or Iu mode is supported by the UE, the UE shall handle the MM parameters update status, TMSI, LAI and ciphering key sequence number, and the GMM parameters GMM state, GPRS update status, P-TMSI, P-TMSI signature, RAI and GPRS ciphering key sequence number as specified in 3GPP TS 24.008 [13] for the case when the combined routing area updating procedure is rejected with the GMM cause with the same value.

7 (EPS services not allowed);

> The UE shall set the EPS update status to EU3 ROAMING NOT ALLOWED (and shall store it according to subclause 5.1.3.3) and shall delete any GUTI, last visited registered TAI, TAI List and eKSI. The UE shall consider then USIM as invalid for EPS services until switching off or the UICC containing the USIM is removed. The UE shall delete the list of equivalent PLMNs and shall enter the state EMM-DEREGISTERED.

A UE in CS/PS mode 1 or CS/PS mode 2 of operation is still IMSI attached for non-EPS services. The UE shall set the update status to U2 NOT UPDATED, shall select GERAN or UTRAN radio access technology and proceed with appropriate MM specific procedure according to the MM service state. The UE shall not reselect E-UTRAN radio access technology until switching off or the UICC containing the USIM is removed.

NOTE: Some interaction is required with the access stratum to disable E-UTRAN cell reselection.

If A/Gb mode or Iu mode is supported by the UE, the UE shall in addition handle the GMM parameters GMM state, GPRS update status, P-TMSI, P-TMSI signature, RAI and GPRS ciphering key sequence number as specified in 3GPP TS 24.008 [13] for the case when the combined routing area updating procedure is rejected with the GMM cause with the same value.

9 (UE identity cannot be derived by the network);

The UE shall set the EPS update status to EU2 NOT UPDATED (and shall store it according to subclause 5.1.3.3) and shall delete any GUTI, last visited registered TAI, TAI List and eKSI. The UE shall delete the list of equivalent PLMNs and enter the state EMM-DEREGISTERED.

Subsequently, the UE shall automatically initiate the attach procedure.

If A/Gb mode or Iu mode is supported by the UE, the UE shall in addition handle the GMM parameters GMM state, GPRS update status, P-TMSI, P-TMSI signature, RAI and GPRS ciphering key sequence number as specified in 3GPP TS 24.008 [13] for the case when the combined routing area updating procedure is rejected with the GMM cause with the same value.

A UE in CS/PS mode 1 or CS/PS mode 2 of operation is still IMSI attached for non-EPS services.

10(Implicitly detached);

The UE shall delete the list of equivalent PLMNs and shall enter the state EMM-DEREGISTERED.NORMAL-SERVICE. The UE shall delete any mapped EPS security context or partial native EPS security context. The UE shall then perform a new attach procedure. If the UE has only LIPA PDN connections when the MME provides cause #10 in a TRACKING AREA UPDATE REJECT, the UE may use an APN in the attach procedure that is different from the APNs corresponding to the LIPA PDN connections.

If A/Gb mode or Iu mode is supported by the UE, the UE shall in addition handle the GMM state as specified in 3GPP TS 24.008 [13] for the case when the combined routing area updating procedure is rejected with the GMM cause with the same value.

A UE in CS/PS mode 1 or CS/PS mode 2 of operation is still IMSI attached for non-EPS services.

The MME shall sends a TRACKING AREA UPDATE REJECT and indicate Implicitly detached if the MME received the TRACKING AREA UPDATE REQUEST from a UE in a cell that is not a CSG cell and the MME determines that the UE has only LIPA PDN connections.

{authors' comment: alternative embodiment}

40(No EPS bearer context activated);

The UE shall delete the list of equivalent PLMNs and deactivate all the EPS bearer contexts locally, if any, and shall enter the state EMM-DEREGISTERED.NORMAL-SERVICE. The UE shall then perform a new attach procedure.

The MME shall sends a TRACKING AREA UPDATE REJECT and indicate No EPS bearer context activated if the MME received the TRACKING AREA UPDATE REQUEST from a UE in a cell that is not a CSG cell and the MME determines that the UE has only LIPA PDN connections.

==========================End of Change====================================

- Change for one embodiment for 3GPP TS 24.008

==========================Begin of Change==================================

* * * Next change * * *

4.7.13.4 Service request procedure not accepted by the network

If the Service request cannot be accepted, the network returns a SERVICE REJECT message to the mobile station. An MS that receives a SERVICE REJECT message stops timer T3317.

If the network receives a SERVICE REQUEST from an MS in a cell that is not a CSG cell or a CSG cell with a CSG identity different from the CSG identity of the cell where the MS activated the LIPA PDP contexts, then the networkshall return a SERVICE REJECT.

If the network receives a SERVICE REQUEST from an MS in a cell that is not a CSG cell or a CSG cell with a CSG identity different from the CSG identity of the cell where the MME recived the ACTIVATE PDP CONTEXT REQUEST from the MS for the LIPA PDP contexts, then the networkshall return a SERVICE REJECT.

The MS shall then take different actions depending on the received reject cause value:

...

10(Implicitly detached);

- The MS shall change to state GMM-DEREGISTERED.NORMAL-SERVICE. The MS shall then perform a new attach procedure. The MS should also activate PDP context(s) to replace any previously active PDP contexts. The MS should also perform the procedures needed in order to activate any previously active multicast service(s). Upon receiving a cause #10, if all the PDP contexts are for LIPA services, then the MS may use an APN in the attach procedure that is different from the APNs corresponding to the LIPA PDP contexts.

If S1 mode is supported in the MS, the MS shall handle the EMM state as specified in 3GPP TS 24.301 [120] for the case when the the service request procedure is rejected with the EMM cause with the same value.

The network shall send a SERVICE REJECT and indicate Implicitly Detached if the network received a SERVICE REQUEST from the UE in a cell that is not a CSG cell and the MS has at east one LIPA PDP context.

The network shall send a SERVICE REJECT and indicate Implicitly Detached if the network received a SERVICE REQUEST from a UE in a CSG cell with a CSG identity different from the CSG identity of the cell where the MS activated the LIPA PDP context or PDP contexts.

NOTE 1: In some cases, user interaction may be required and then the MS cannot activate the PDP and MBMS context(s) automatically.

...

40(No PDP context activated)

- The MS shall deactivate locally all active PDP and MBMS contexts and the MS shall enter the state GMM-REGISTERED.NORMAL-SERVICE. The MS may also activate PDP context(s) to replace any previously active PDP contexts. The MS may also perform the procedures needed in order to activate any previously active multicast service(s). If the MS has only LIPA PDP contexts when the network provides cause #40, if the MS activate PDP context(s) to replace any previously active PDP contexts, it should not request for a LIPA PDP context in the ACTIVATE PDP CONTEXT REQUEST. If a specific APN is used for LIPA, the UE should use an APN in the attach ACTIVATE PDP CONTEXT REQUEST that is different from the APNs corresponding to the LIPA PDP contexts The network shall send a SERVICE REJECT and indicate No PDP context activated if the network receives a SERVICE REQUEST from a UE in a cell that is not a CSG cell and the MME determines that the MS has at east one LIPA PDP context.

The network shall send a SERVICE REJECT and indicate No PDP context activated if the network receives a SERVICE REQUEST from a UE in a CSG cell with a CSG identity different from the CSG identity of the cell where the MS activated the LIPA PDP context or PDP contexts

* * * End of next change * * *

What is claimed is:

1. A method in a core network communicatively connected with a first radio access network (RAN) comprising a first network element, and a second RAN comprising a second network element, comprising:
   receiving, by a mobility management node in the core network, a first Non Access Stratum (NAS) message via the second network element from a User Equipment (UE), wherein the UE has, with the first network element, at least one of a Local Internet Protocol (IP) Access (LIPA) packet data network (PDN) connection and a selected IP traffic offload (SIPTO) PDN connection;
   detecting, by the mobility management node, that the UE is connected to the second network element that is different from the first network element that has a first identifying characteristic, and wherein the detecting comprises determining that the first NAS message is received with a second identifying characteristic of the second network element different from the first identifying characteristic associated with the at least one of the LIPA PDN connection and the SIPTO PDN connection, the first identifying characteristic stored at the mobility management node; and
   in response to the determining that the first NAS message is received with the second identifying characteristic of the second network element different from the first identifying characteristic:
      deactivating, by the mobility management node, the at least one of the LIPA PDN connection and the SIPTO PDN connection; and
      in response to a condition that no PDN connection remains as a result of the deactivating, sending, by the mobility management node, a second NAS message causing the UE to perform a new attach procedure, wherein the second NAS message includes at least one of an indication to force the UE to perform the new attach procedure, and a cause code with a value that represents at least one of "Implicitly Detached" and "No EPS Bearer Context Activated."

2. The method of claim 1, wherein the first NAS message is a Tracking Area Update Request message and the second NAS message is a Tracking Area Update Reject message.

3. The method of claim 1, wherein said detecting includes determining that the second network element does not support the at least one of the LIPA PDN connection and the SIPTO PDN connection.

4. The method of claim 1, wherein said detecting is based in part upon bearer context information stored at the mobility management node.

5. The method of claim 4, further comprising:
   maintaining the bearer context information in a memory store, the bearer context information including a gateway IP address.

6. The method of claim 1, wherein the mobility management node is either a Mobility Management Entity (MME) or a Serving GPRS Support Node (SGSN).

7. The method of claim 1, wherein the first network element includes a Local Gateway (L-GW) that is associated with the at least one of the LIPA PDN connection and the SIPTO PDN connection.

8. The method of claim 1, wherein the first network element has connectivity to a Local Gateway (L-GW) that is associated with the at least one of the LIPA PDN connection and the SIPTO PDN connection.

9. The method of claim 1, wherein the first NAS message is a one of a Tracking Area Update Request message, a Service Request message, an Extended Service Request message, a Routing Area Update message, and a paging response message.

10. The method of claim 1, wherein the cause code with the value that represents "Implicitly Detached" is to cause the UE to release all bearer contexts.

11. The method of claim 1, wherein the cause code with the value that represents "No EPS Bearer Context Activated" is to cause the UE to release context information of the UE and establish a new PDN connection.

12. A mobility management node for use in a core network communicatively connected to a first radio access network (RAN) comprising a first network element, and a second RAN comprising a second network element, comprising:
   a memory; and
   at least one processor coupled to the memory and configured to:
      receive a first Non Access Stratum (NAS) message via the second network element from a User Equipment (UE), wherein the UE has, with the first network element, at least one of a Local Internet Protocol (IP) Access (LIPA) packet data network (PDN) connection and a selected IP traffic offload (SIPTO) PDN connection;
      detect that the UE is connected to the second network element that is different from the first network element that has a first identifying characteristic, wherein the detecting comprises determining that the first NAS message is received with a second identifying characteristic of the second network element different from the first identifying characteristic associated with the at least one of the LIPA PDN connection and the SIPTO PDN connection, the first identifying characteristic stored at the mobility management node; and
      in response to the determining that the first NAS message is received with the second identifying characteristic of the second network element different from the first identifying characteristic:
         deactivate the at least one of the LIPA PDN connection and the SIPTO PDN connection; and
         in response to a condition that no PDN connection remains as a result of the deactivating, send a second NAS message causing the UE to perform a new attach procedure, wherein the second NAS message includes at least one of an indication to force the UE to perform the new attach procedure, and a cause code with a value that represents at least one of "Implicitly Detached" and "No EPS Bearer Context Activated."

13. A computer program product comprising a non-transitory computer readable storage medium having computer readable program code embodied therein, said computer readable program code upon execution causing a mobility management node in a core network communicatively connected to a first radio access network (RAN) comprising a first network element and a second RAN comprising a second network element, to:
   receive a first Non Access Stratum (NAS) message via the second network element from a User Equipment (UE), wherein the UE has, with the first network element, at least one of a Local Internet Protocol (IP) Access (LIPA) packet data network (PDN) connection and a selected IP traffic offload (SIPTO) PDN connection;
   detect that the UE is connected to the second network element that is different from the first network element that has a first identifying characteristic, wherein the detecting comprises determining that the first NAS message is received with a second identifying characteristic of the second network element different from the first identifying characteristic associated with the at least one of the LIPA PDN connection and the SIPTO PDN connection, the first identifying characteristic stored at the mobility management node; and in response to the determining that the first NAS message is received with the second identifying characteristic of the second network element different from the first identifying characteristic:

deactivate the at least one of the LIPA PDN connection and the SIPTO PDN connection; and in response to a condition that no PDN connection remains as a result of the deactivating, send a second NAS message causing the UE to perform a new attach procedure, wherein the second NAS message includes at least one of an indication to force the UE to perform the new attach procedure, and a cause code with a value that represents at least one of "Implicitly Detached" and "No EPS Bearer Context Activated."

14. The computer program product of claim 13, wherein the detecting includes determining that the second network element does not support the at least one of the LIPA PDN connection and the SIPTO PDN connection.

* * * * *